United States Patent
Richardson

(10) Patent No.: US 9,876,670 B2
(45) Date of Patent: Jan. 23, 2018

(54) LOCAL NETWORK NODE

(75) Inventor: Andrew Richardson, Cambridgeshire (GB)

(73) Assignee: CommScope Technologies LLC, Hickory, NC (US)

(*) Notice: Subject to any disclaimer, the term of this patent is extended or adjusted under 35 U.S.C. 154(b) by 1394 days.

(21) Appl. No.: 11/572,979

(22) PCT Filed: Aug. 1, 2005

(86) PCT No.: PCT/GB2005/003007
§ 371 (c)(1),
(2), (4) Date: Jan. 30, 2007

(87) PCT Pub. No.: WO2006/010953
PCT Pub. Date: Feb. 2, 2006

(65) Prior Publication Data
US 2008/0003988 A1    Jan. 3, 2008

(30) Foreign Application Priority Data

Jul. 30, 2004 (GB) .................................. 0417029.6
Jul. 30, 2004 (GB) .................................. 0417032.0
(Continued)

(51) Int. Cl.
*H04L 29/06* (2006.01)

(52) U.S. Cl.
CPC .... *H04L 29/06027* (2013.01); *H04L 65/1006* (2013.01); *H04L 65/1069* (2013.01); *H04L 65/1073* (2013.01); *H04L 65/80* (2013.01)

(58) Field of Classification Search
CPC ........... H04L 29/06027; H04L 65/1006; H04L 65/1069; H04L 65/1073; H04L 65/80;
(Continued)

(56) References Cited

U.S. PATENT DOCUMENTS 6,711,144 B1    3/2004 Kim et al.
6,731,618 B1    5/2004 Chung et al.
(Continued)

FOREIGN PATENT DOCUMENTS

EP    0817516        1/1998
EP    1 411 670 A1   4/2004
(Continued)

OTHER PUBLICATIONS

Gupta (IEEE 802.21 Media Independent Handover Service, Draft Technical Requirements, 21-04-0087-00-0000, Jul. 12, 2004).*
(Continued)

*Primary Examiner* — George Eng
*Assistant Examiner* — Jing Gao
(74) *Attorney, Agent, or Firm* — Fogg & Power LLC

(57) ABSTRACT

A communication system comprising a local network node (LNN) is described for connecting with a user terminal in a 3G network. The LNN provides a local user-controlled access point for the network that may be installed in the home or office by-passing connection through network Node Bs. If the User passes outside the coverage area provided by the LNN, then a handover between the LNN and an appropriate Node B preferably takes place so that the User's connection to the 3G network is substantially unaffected. The LNN is arranged to provide protocol conversion between the 3G control messages received from the UE to the equivalent SIP/SDP messages required for maintenance of connections in Internet Protocol based networks, such as the Release 5 architecture.

22 Claims, 14 Drawing Sheets

(30) Foreign Application Priority Data

| | | | |
|---|---|---|---|
| Jul. 30, 2004 | (GB) | ................................... | 0417049.4 |
| Jul. 30, 2004 | (GB) | ................................... | 0417054.4 |
| May 6, 2005 | (GB) | ................................... | 0509315.8 |

(58) Field of Classification Search
CPC . H04L 67/14; H04L 65/1043; H04L 65/1016;
H04L 12/66; H04L 29/06176; H04L
65/1023; H04L 65/1033; H04W 36/10;
H04W 12/06; H04W 60/04; H04W 88/16;
H04W 92/02; H04W 76/02; H04M 3/005
USPC .............. 455/466, 422.1, 426.1, 432.2, 445;
370/310, 315, 328, 338
See application file for complete search history.

(56) References Cited

U.S. PATENT DOCUMENTS

| | | | |
|---|---|---|---|
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,603,127 B2 | 10/2009 | Chung et al. | |
| 2001/0046859 A1 | 11/2001 | Kil | |
| 2002/0076179 A1 | 6/2002 | Hardwick, III et al. | |
| 2002/0110104 A1* | 8/2002 | Surdila et al. ................. | 370/338 |
| 2002/0160790 A1 | 10/2002 | Schwartz et al. | |
| 2002/0187789 A1* | 12/2002 | Diachina et al. ............ | 455/452 |
| 2002/0196749 A1 | 12/2002 | Eyuboglu et al. | |
| 2003/0100311 A1 | 5/2003 | Chung et al. | |
| 2004/0005886 A1* | 1/2004 | Oda ........................ | H04L 63/10 |
| | | | 455/422.1 |
| 2004/0030895 A1* | 2/2004 | Tachikawa .................... | 713/168 |
| 2004/0076179 A1 | 4/2004 | Kaminski et al. | |
| 2005/0010665 A1* | 1/2005 | Kuno ...................... | H04L 29/06 |
| | | | 709/224 |
| 2005/0071434 A1* | 3/2005 | Hettish et al. ................ | 709/207 |
| 2005/0117605 A1* | 6/2005 | Yan et al. ..................... | 370/469 |
| 2005/0157673 A1* | 7/2005 | Verma et al. ................. | 370/328 |
| 2005/0213555 A1 | 9/2005 | Eyuboglu et al. | |
| 2005/0243749 A1 | 11/2005 | Mehrabanzad et al. | |
| 2005/0245263 A1* | 11/2005 | Ejzak ............... | H04W 36/0022 |
| | | | 455/445 |
| 2005/0245279 A1 | 11/2005 | Mehrabanzad et al. | |
| 2005/0254451 A1* | 11/2005 | Grosbach .............. | H04L 65/103 |
| | | | 370/328 |
| 2006/0067422 A1 | 3/2006 | Chung | |
| 2006/0067451 A1 | 3/2006 | Pollman et al. | |
| 2006/0077924 A1* | 4/2006 | Rune .............................. | 370/328 |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'ng et al. | |
| 2009/0170520 A1 | 7/2009 | Jones | |
| 2009/0170547 A1 | 7/2009 | Raghothaman et al. | |
| 2009/0172169 A1 | 7/2009 | Ch'Ng et al. | |
| 2009/0172397 A1 | 7/2009 | Kim | |
| 2009/0186626 A1 | 7/2009 | Raghothaman et al. | |
| 2009/0262697 A1 | 10/2009 | To et al. | |

FOREIGN PATENT DOCUMENTS

| | | |
|---|---|---|
| EP | 1411670 | 4/2004 |
| GB | 2304495 | 3/1997 |
| GB | 2 372 909 A | 9/2002 |
| GB | 2372909 | 9/2002 |
| GB | 2390953 | 1/2004 |
| GB | 2408430 | 5/2005 |
| GB | 2452688 | 3/2009 |
| WO | 1999/043109 A1 | 8/1999 |
| WO | WO 1999/043109 | 8/1999 |
| WO | 2000/018014 A1 | 3/2000 |
| WO | WO 2000/018014 | 3/2000 |
| WO | 2000/028752 A1 | 5/2000 |
| WO | WO 2000/028752 | 5/2000 |
| WO | 2001/052427 A1 | 7/2001 |
| WO | WO 2001/052427 | 7/2001 |
| WO | 2001/056147 A1 | 8/2001 |
| WO | WO 2001/056147 | 8/2001 |
| WO | 2002/007341 A2 | 1/2002 |
| WO | 2002/007380 A2 | 1/2002 |
| WO | 2002/007471 A1 | 1/2002 |
| WO | 2002/007474 A1 | 1/2002 |
| WO | WO 2002/007341 | 1/2002 |
| WO | WO 2002/007380 | 1/2002 |
| WO | WO 2002/007471 | 1/2002 |
| WO | WO 2002/007472 | 1/2002 |
| WO | 2002/037882 A1 | 5/2002 |
| WO | 0237798 A1 | 5/2002 |
| WO | WO 2002/37798 | 5/2002 |
| WO | WO 2002/037882 | 5/2002 |
| WO | 2002/049275 A2 | 6/2002 |
| WO | WO 2002/049275 | 6/2002 |
| WO | 2002/085056 A1 | 10/2002 |
| WO | 2002/087192 A1 | 10/2002 |
| WO | WO 2002/085056 | 10/2002 |
| WO | WO 2002/087192 | 10/2002 |
| WO | 2003/025768 A1 | 3/2003 |

(56) References Cited

FOREIGN PATENT DOCUMENTS

| WO | WO 2003/025768 | | 3/2003 |
|---|---|---|---|
| WO | 2003/041277 | A2 | 5/2003 |
| WO | 2003/044949 | A2 | 5/2003 |
| WO | 2003/044961 | A2 | 5/2003 |
| WO | WO 2003/041277 | | 5/2003 |
| WO | WO 2003/044949 | | 5/2003 |
| WO | WO 2003/044961 | | 5/2003 |
| WO | 2003/049299 | A2 | 6/2003 |
| WO | WO 2003/049299 | | 6/2003 |
| WO | 2003/084084 | A1 | 10/2003 |
| WO | WO 2003/084084 | | 10/2003 |
| WO | 2003/103162 | A1 | 12/2003 |
| WO | WO 03/105493 | A2 * | 12/2003 |
| WO | WO 2003/103162 | | 12/2003 |
| WO | 2004/019596 | A2 | 3/2004 |
| WO | WO 2004/019596 | | 3/2004 |
| WO | 2004/1032548 | A1 | 4/2004 |
| WO | WO 2004/032548 | | 4/2004 |
| WO | 2004/042934 | A1 | 5/2004 |
| WO | 2004/042990 | A1 | 5/2004 |
| WO | WO 2004/042934 | | 5/2004 |
| WO | WO 2004/042990 | | 5/2004 |
| WO | 2004/054124 | A1 | 6/2004 |
| WO | WO 2004/054124 | | 6/2004 |
| WO | 2004/059959 | A1 | 7/2004 |
| WO | 2004/063937 | A2 | 7/2004 |
| WO | WO 2004/059959 | | 7/2004 |
| WO | WO 2004/063937 | | 7/2004 |
| WO | 2004/077693 | A1 | 9/2004 |
| WO | 2004/080018 | A1 | 9/2004 |
| WO | 2004/082149 | A2 | 9/2004 |
| WO | WO 2004/077693 | | 9/2004 |
| WO | WO 2004/080018 | | 9/2004 |
| WO | WO 2004/082149 | | 9/2004 |
| WO | WO 2006/010953 | | 2/2006 |
| WO | WO 2006/010957 | | 2/2006 |
| WO | WO 2006/010958 | | 2/2006 |

OTHER PUBLICATIONS

Plasse (SIP for Call Control in the 3G IP-Based UMTS Core Network, Interworking 2000, LNCS 1938, pp. 32-38, 2000).*

Lin et al. (One-Pass GPRS and IMS Authentication Procedure for UMTS, Jan. 23, 2004).*

International Search Report and Written Opinion dated Jan. 10, 2006 in PCT application No. PCT/GB2005/003028, Publication No. WO 2006/010957 (12 pages).

International Search Report and Written Opinion dated Jul. 26, 2006 in PCT application No. PCT/GB2005/003034, Publication No. WO 2006/010958 (17 pages).

International Search Report and Written Opinion dated Feb. 24, 2006 in PCT application No. PCT/GB2005/003007, Publication No. WO 2006/010953 (15 pages).

International Search Report and Written Opinion dated Jan. 10, 2006 in corresponding PCT application No. PCT/GB2005/003028, Publication No. WO 2006/010957 (12 pages).

International Search Report and Written Opinion dated Jul. 26, 2006 in corresponding PCT application No. PCT/GB2005/003034, Publication No. WO 2006/010958 (17 pages).

International Search Report and Written Opinion dated Feb. 24, 2006 in corresponding PCT application No. PCT/GB2005/003007, Publication No. WO 2006/010953 (15 pages).

Universal Mobile Telecommunications System (UMTS); Provision of Services in UMTS—The Virtual Home Environment (Highlighting release 99 requirement), TS 22.21 V1.10.0, Jan. 1999 (Jan. 1999), 22 pages.

3$^{rd}$ Generation Partnership Project; Technical Specification Group Radio Access Network; Physical layer-Measurements (FDD) (Release 4), 3GPP TS 25.215 V4.6.0 (Dec. 2002), 18 pages.

3$^{rd}$ Generation Partnership Project; Technical Specification Group Core Network and Terminals; Signalling Flows for the IP Multimedia Call Control Based on Session Initiation Protocol (SIP) and Session Description Protocol (SDP); Stage 3 (Release 5), 3GPP TS 24.228 V5.15.0 (Sep. 2006), 851 pages.

3$^{rd}$ Generation Partnership Project; Technical Specification Group Core Network and Terminals; Handover Procedures (Release 7), 3GPP TS 23.009 V7.0.0 (Mar. 2007), 287 pages.

3$^{rd}$ Generation Partnership Project; Technical Specification Group Services and Systems Aspects; Network Architecture (Release 8), 3GPP TS 23.002 V8.0.0 (Jun. 2007), 62 pages.

3$^{rd}$ Generation Partnership Project; Technical Specification Group Core Network and Terminals; IP Multimedia Call Control Protocol Based on Session Initiation Protocol (SIP) and Session Description Protocol (SDP); Stage 3 (Release 8), 3GPP TS 24.229 V8.0.0 (Jun. 2007), 438 pages.

3$^{rd}$ Generation Partnership Project; Technical Specification Group Radio Access Network; UTRAN Iu interface RANAP Signalling (Release 7), 3GPP TS 25.413 V7.6.0 (Jun. 2007), 359 pages.

3$^{rd}$ Generation Partnership Project; Technical Specification Group Core Network and Terminals; Mobile Application Part (MAP) Specification; (Release 8), 3GPP TS 29.002 V8.2.0 (Jun. 2007), 911 pages.

Universal Mobile Telecommunications System (UMTS); Provision of Services in UMTS—The Virtual Home Environment (Highlighting release 99 requirement), TS 22.21 V1.10.0, (Jan. 1999), 22 pages.

3rd Generation Partnership Project; Technical Specification Group Radio Access Network; Physical layer-Measurements (FDD) (Release 4), 3GPP TS 25.215 V4.6.0 (Dec. 2002), 18 pages.

3rd Generation Partnership Project; Technical Specification Group Core Network and Terminals; Signalling Flows for The IP Multimedia Call Control Based on Session Initiation Protocol (SIP) and Session Description Protocol (SDP); Stage 3 (Release 5), 3GPP TS 24.228 V5.15.0 (Sep. 2006), 851 pages.

3rd Generation Partnership Project; Technical Specification Group Core Network and Terminals; Handover Procedures (Release 7), 3GPP TS 23.009 V7.0.0 (Mar. 2007), 287 pages.

3rd Generation Partnership Project; Technical Specification Group Services and Systems Aspects; Network Architecture (Release 8), 3GPP TS 23.002 V8.0.0 (Jun. 2007), 62 pages.

3rd Generation Partnership Project; Technical Specification Group Core Network and Terminals; IP Multimedia Call Control Protocol Based on Session Initiation Protocol (SIP) and Session Description Protocol (SDP); Stage 3 (Release 8), 3GPP TS 24.229 V8.0.0 (Jun. 2007), 438 pages.

3rd Generation Partnership Project; Technical Specification Group Radio Access Network; UTRAN Iu interface RANAP Signalling (Release 7), 3GPP TS 25.413 V7.6.0 (Jun. 2007), 359 pages.

3rd Generation Partnership Project; Technical Specification Group Core Network and Terminals; Mobile Application Part (MAP) Specification; (Release 8), 3GPP TS 29.002 V8.2.0 (Jun. 2007), 911 pages.

European Patent Office, "Communication Pursuant to Article 94(3) EPC from EP Application No. 05767600.9", "from U.S. Appl. No. 11/572,979", Nov. 25, 2016, pp. 1-4, Published in: EP.

* cited by examiner

LOCAL NETWORK NODE

This application is a U.S. national phase application filed under 35 U.S.C. §371 of International application PCT/GB2005/003007, filed on Aug. 1, 2005, designating the United States, which claims the benefit of Great Britain Applications Nos. 0417032.0, 0417029.6, 0417054.4, and 0417049.4, filed on Jul. 30, 2004, and 0509315.8, filed on May 6, 2005, which are hereby incorporated by reference herein.

The invention relates to a communication system and in particular to a system for connecting with a user terminal in a 3G network.

3G cellular communication systems and in particular the Frequency Division Duplex or Time Division Duplex (FDD/TDD) mode of the Wideband Code Division Multiple Access (WCDMA) system, defined by the Third Generation Partnership Project (3GPP), are known and are described in more detail at www.3gpp.org.

The 3G cellular communication system provides subscribers with the ability to transmit text, digitised voice, video and other multi-media data from their mobile handset. The system is presently implemented by the Universal Mobile Telecommunications Service (UMTS), which builds on the existing Global System for Mobile Communications (GSM) network and General Packet Radio Service (GPRS) technology. The initial specification for UMTS is referred to as 'Release 99', (R99) and defines the standard network architecture for UMTS systems. More recently 'Release 5' (R5) has been developed, expanding the Release 99 functionality to include The IP Multimedia Subsystem (IMS). This provides an all Internet Protocol based wireless network, in comparison to the separate voice, data, signalling, and control network elements of Release 99 systems. Release 99 and Release 5 architecture will now be described in more detail by way of background and with reference to FIG. 1.

The Release 99 architecture is illustrated in the lower part of FIG. 1. User Equipment (UE) 4 connects to the Node B 6, the Node B to the Radio Network Controller (RNC) 8 and the RNC to a Mobile Switching Centre (MSC) 10 in this case the MSC_B. The MSC allows interconnection to other networks and to the Public Switched Telephone Network (PSTN) 12. The MSC_B has access to the home location register (HLR) 14 and to the Authentication Centre (AuC) via the HLR.

The functions of the various elements are briefly described as follows:
1) The Node B is the transmitter site equipment, containing all of the radio transmitter and receiver apparatus necessary for communication with the UE.
2) The Radio Network Controller is responsible for controlling the Node B's and the radio connections between any UEs in the coverage area and the MSC.
3) The Mobile Switching Centre is the circuit switched device that is responsible for controlling normal Circuit Switched connections to the UE. It typically comprises a normal telephone switch, plus the necessary database and processing functions that are necessary to manage calls to and from UEs as they move through the coverage area of the network.
4) The Home Location Register is a database that stores the details of a specific subscriber including its identity and subscription data. The Authentication Centre is a network and processing entity that provides security information on demand from network entities that regulate encryption and authentication.

The upper half of FIG. 1 illustrates the Release 5 IMS network architecture 20. In addition to the Node B 22 and the RNC 24, there is the Packet Switched PS domain Serving GPRS Support Node and Gateway GPRS Support Node (SGSN/GGSN) 26 and the IMS specific components such as Proxy-Call Session Control Function (P-CSCF) 28, Serving-Call Session Control Function (S-CSCF) 30, the Home Subscriber Server (HSS) 32, the Media Gateway Control Function (MGCF) 34 and the media gateway (MGW) 34 which connects to the PSTN 36. The media sessions are established from the UE 4 via the Packet Switched (PS) domain and the P-CSCF and the S-CSCF. If the media session is via an external network such as the PSTN or another Public Land Mobile Network (PLMN) then the MGCF and the MGW are also required. The structure and operation of the IMS within the R5 network architecture are well known by those skilled in the art and are defined in the 3GPP specifications TS23.002, TS24.228 and TS24.229.

The role of the different elements will now be described in more detail:
1) The Serving GPRS Support Node (SGSN) is the first element responsible for connecting the UE to the UMTS network for packet switched data services. The SGSN is responsible for a range of services such as registration of UEs for packet data sessions, and for managing the mobility of the UEs as they move through the coverage area.
2) The Gateway GPRS Support Node (GGSN) is the gateway to the external packet data networks such as the Internet or the IP Multimedia System, managing the external connections and other issues such as Quality of Service (QoS) control.
3) The Proxy Call Session Control Function (P-CSCF) is one of the SIP proxies that are defined specifically for use within the R5 architecture. The role of the P-CSCF is to provide a SIP gateway into the IMS and to also provide for QoS control and negotiation for the SIP sessions.

The Session Initiation Protocol (SIP) is a standard protocol for initiating an interactive user session that involves multimedia elements such as video, voice, chat, and gaming. Like HTTP, SIP works in the application layer of the Open Systems Interconnection (OSI) model, and can establish multimedia sessions or Internet telephony calls, and terminate them. SIP is specified in the IETF Request For Comments [RFC] 3261.
4) The Serving Call Session Control Function (S-CSCF) is another SIP proxy that is defined specifically for use within the R5 architecture. The S-SCSF provides for session control from a service perspective, such as registering UEs for SIP services and authorising the specific services requested by the UEs.
5) The Home Subscriber Server (HSS) is a super-set of the Home Location Register (HLR) that was defined for the R99 Network. The HSS is a database that contains all of the information that is required by a network for a specific UE, such as the identity of the UE, the secret keys used for security procedures and a list of the specific services that the UEs are entitled to request.
6) The MGCF is the device that is responsible for controlling the media gateways. The MGCF is used whenever there is a request to connect the UE to external networks such as the PSTN. The MGCF interacts with the S-CSCF when a request for an SIP session requires the use of connections to external networks such as the PSTN.

7) The Media Gateway is the point of contact between the external networks, such as the PSTN, and the R5 architecture. The MGW converts the media between different transport technologies.

As can be seen from FIG. 1 connection to either of these systems is via a Node B, typically located as part of a radio mast at an elevated location. As usage of user terminals providing 3G capabilities becomes more wide spread however, we have appreciated that it would be desirable to allow more specific control over the access to the network, either for a defined group of user terminals, or for a user terminals in a specific location. In addition, we have appreciated that it would be desirable for any modification or addition to the existing technology to be both compatible with the systems mentioned above, and flexible enough to accommodate any changes to the system allow or work with new technologies as they are developed.

SUMMARY OF INVENTION

The invention is defined in the independent claims to which reference should now be made. Advantageous features are set forth in the appendent claims.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENT

Figure 1:
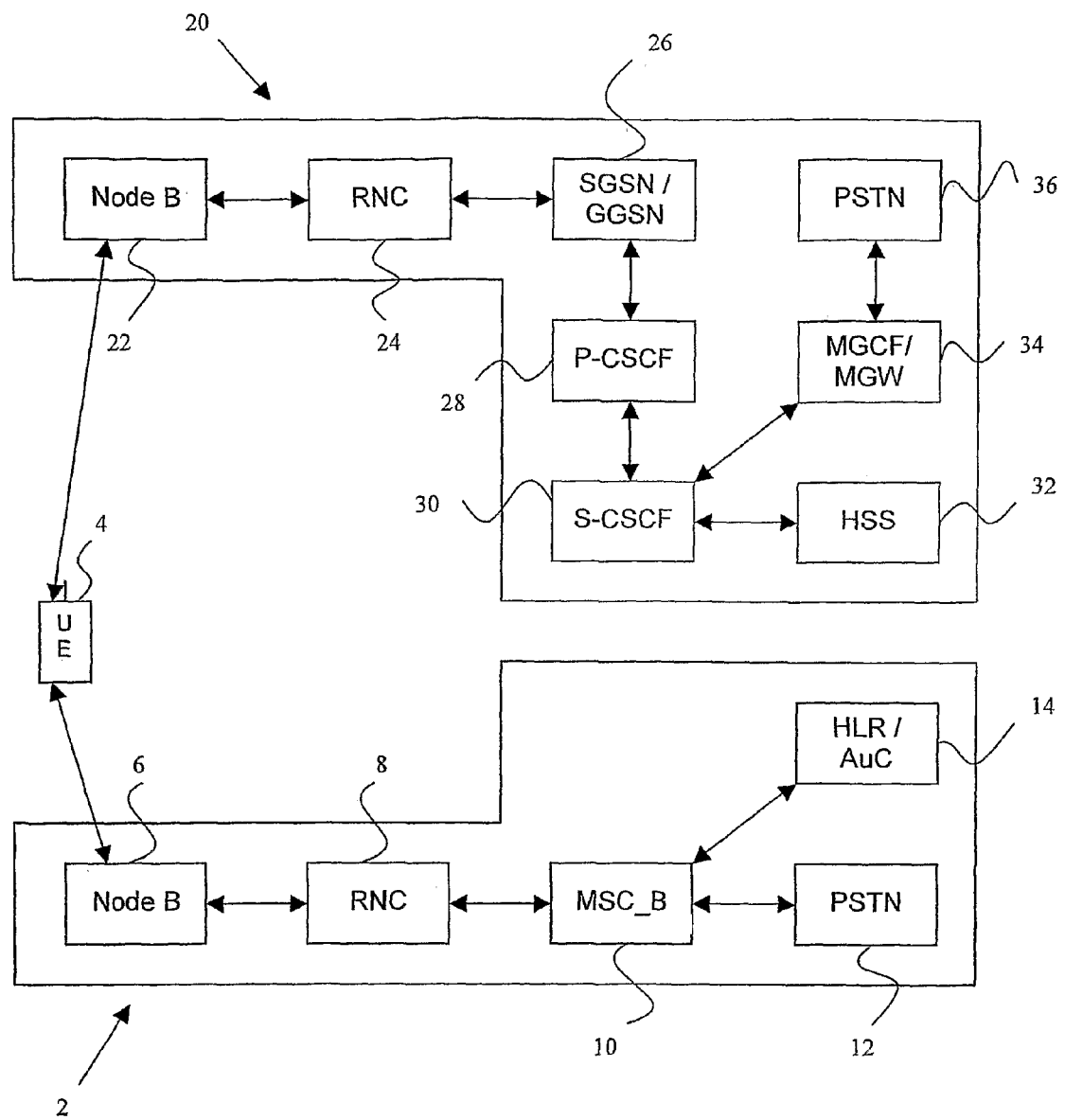
FIG. 1 is an illustration of the existing UMTS network architectures comprising the Release 99 and Release 5 architectures.
Figure 2:
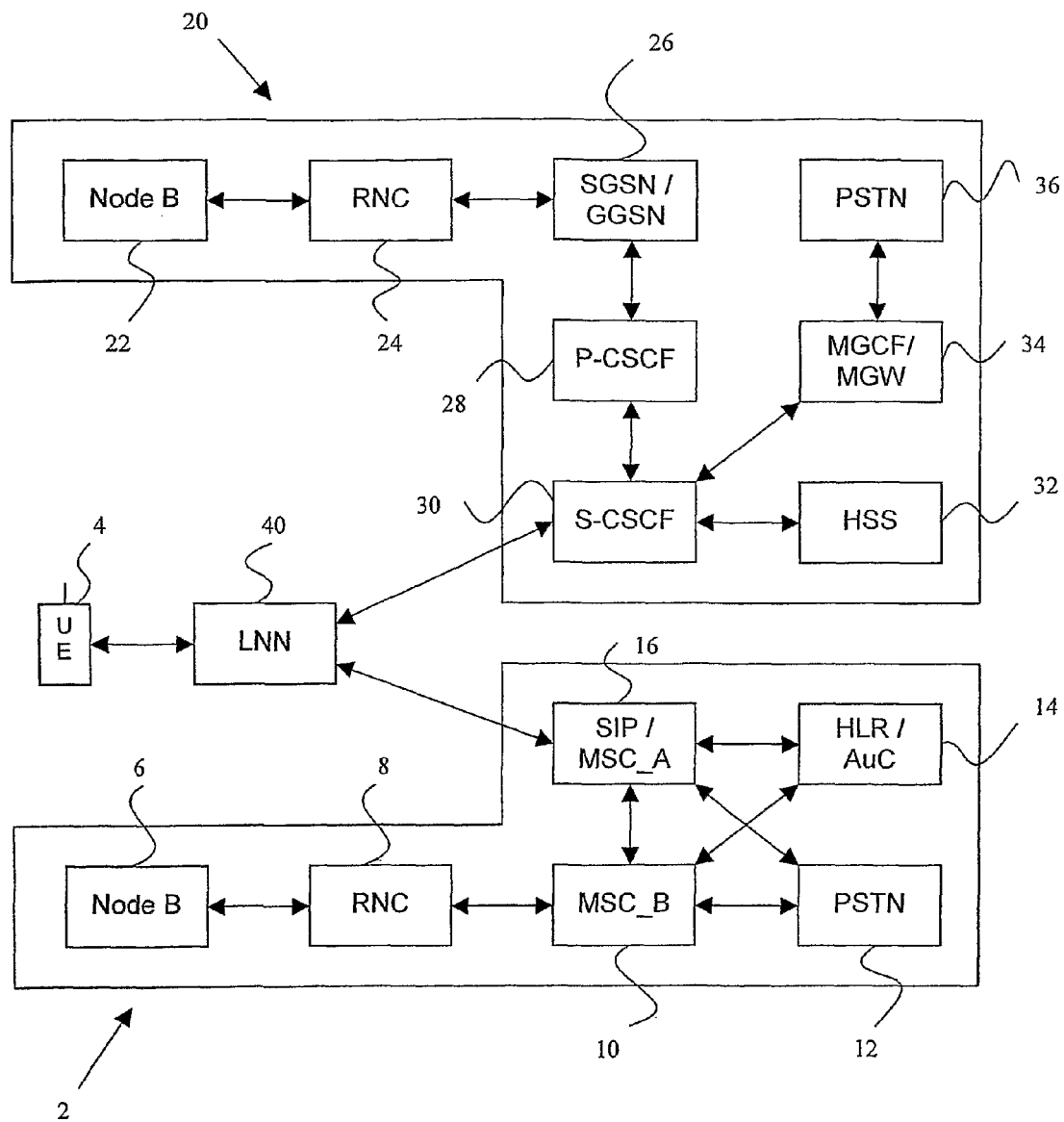
FIG. 2 is an illustration of a system according to a preferred embodiment of the invention.

The operation of a preferred embodiment of the invention will now be described in more detail with reference to FIG. 2. FIG. 2 illustrates the Release 99 and Release 5 architectures as shown in FIG. 1, and common components have therefore been given the same reference number as before. Additionally, a Local Network Node (LNN) 40 is provided to manage the access of the UE to the networks on a local scale. In order to accommodate the LNN in the Release 99 architecture, the SIP/MSC_A element 16 is also provided, logically connected to MSC_B 10, HLR/AuC 14 and PSTN 12.

Preferably, the LNN connects via a Private/Public IP Network connection to the SIP interface of the MSC_A, or to the Serving Call Session Control Function (S-CSCF). The LNN may also connect to the P-CSCF though this is not shown in FIG. 2. As mentioned above, the UE 4 would normally connect to the network via Node B typically co-located with a Base Transceiver Station of the underlying GSM system. The LNN however provides a local user-controlled access point for the network that may be installed in the home or office by-passing connection through the Node B's altogether. Typically, the access point will be via an ASDL connection to a telephone line in the home or office. Thus the LNN provides a private cell to the user.

The LNN therefore connects the UEs in the coverage area with the 3G network, allowing 3G services to be accessed in the home or office via a local access point. Thus, the LNN may be operated instead of or in addition to a user's standard private telephone connection. Throughout the description, the term 3G network is used to mean any system or network including the 3G radio interface in combination with any other network architecture, such as GSM, PSTN. PABX, PBX, CDMA 2000, Next Generation Networks (NGN), and so on.

A subscribing User Terminal can therefore access the network via the LNN and receive network services provided under terms and conditions specific to the LNN. If the User passes outside the coverage area provided by the LNN, then a handover between the LNN and an appropriate Node B preferably takes place so that the User's connection to the 3G network is substantially unaffected.

The LNN is arranged to provide protocol conversion between the 3G control messages received from the UE to the equivalent SIP/SDP messages required for maintenance of connections in Internet Protocol based networks, such as the Release 5 architecture. Once a connection has been established, any user data, such as speech or video data packets are extracted from the 3G Radio Access Bearers, and input as packets into the Real Time Protocol stream for transmission across the IP based network. In converting the packet from the 3G protocol to the RTP protocol, the data itself need not change, only the header information for the packet need be updated to suit each respective protocol.

The translation between protocols is preferably achieved by having an arrangement such as a look-up table of mappings between messages in the 3G and SIP/SDP protocols, as well as a register of the status of each UE connected to the LNN. In this context, status is meant to indicate the point in a communication protocol that the UE has reached, such as what 3G message was last received from the UE or transmitted to it.

It will be appreciated that the exchange of messages in either the 3G or SIP/SDP protocols conform to a predetermined sequence and format. Thus, if a particular message is received from a UE, and the present status of the UE is known, it is possible to determine the next message, in either the 3G or SIP/SDP formats, that is required for the connection to be established or for communication to continue.

The look-up table may be implemented as a state machine therefore in which each UE has a state, such as ACTIVE, IDLE, and DEACTIVATED for example, and in which movement between states triggers a predetermined sequence of messages in either of the above mentioned protocols.

Figure 3:
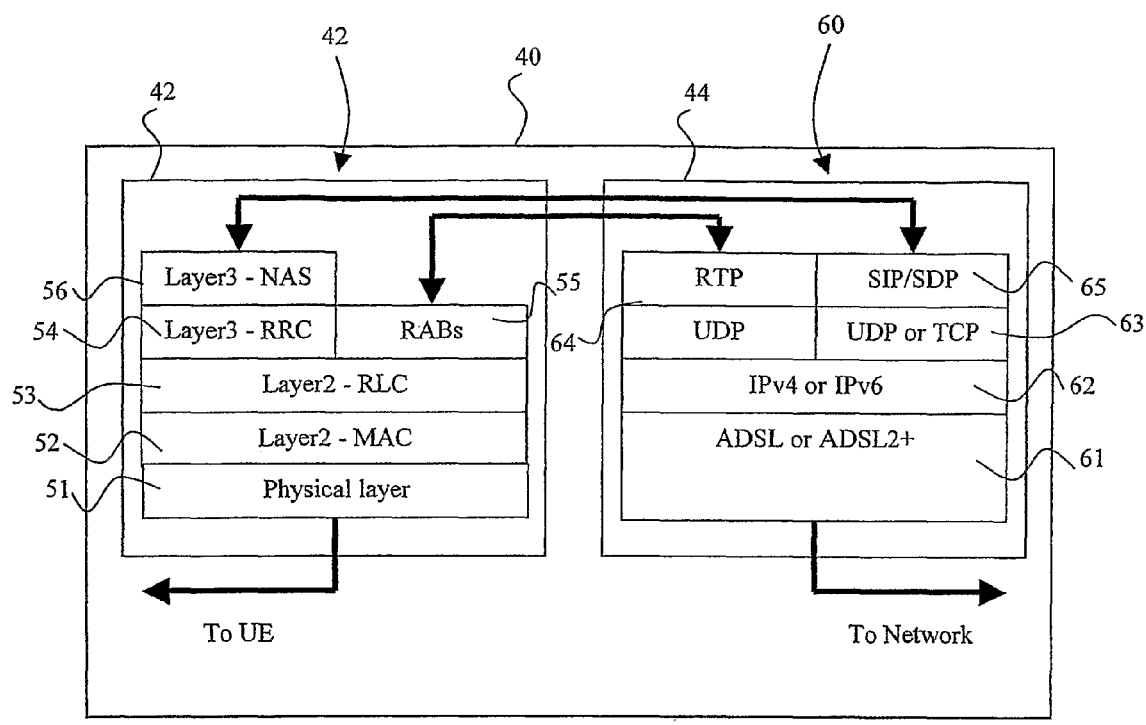
FIG. 3 is a schematic illustration of the logical protocols employed within the local network node according to a preferred embodiment of the invention.

Knowing which messages are required in each case for the continuation of any process that is underway, translation can occur simply by extracting the relevant data from a message in one format, and using the extracted data to populate the relevant fields in a message of the other format. Translation between 3G messages, and SIP/SDP messages can therefore be performed based on a pattern matching process. SIP/SDP messages are text, allowing parameters to be identified and extracted by looking for particular field names for example, or by extracting pre-determined parts of the message provided that the function of that part is understood. 3G messages are actually based on bitmaps, but the translation procedure can be performed as simply as if they were based on text. Preferably, the bit map would first be parsed to convert it to text components, which could then be handled in the normal way. The operation of any translation will become clear from the discussion of FIG. 3 given below, and from, the later Figures illustrating the message flows for particular processes between the UE and the network via the LNN. Not all messages received from the UE require translation, only those that relate to controlling or establish a network service for example.

The functional composition of the LNN is shown in more detail in FIG. 3 to which reference should now be made. The LNN comprises a User terminal side 42 comprising a first protocol processing stack for processing 3G data received from or transmitted to the User Terminal 50 over the air interface, and a Network Side 44 comprising a second processing stack 60 for dealing with IP data.

In known fashion, the first protocol stack contains Physical layer 51, above which are located the Layer 2 Medium Access Control (MAC) layer 52, the Layer 2 Radio Link Control (RLC) layer 53, the Layer 3 Radio Resource Control (RRC) layer 54, including the Radio Access Bearer (RAB) control function 55, and the Layer 3 Non-Access Stratum (NAS) function 56 in turn.

The Physical layer manages the modulation of data packets from the upper layers onto the RF carrier, including the application of the CDMA spreading and scrambling codes in UMTS applications. It is therefore responsible for the transmission of data over the air interface via a number of transport channels. The layer 2 Medium Access Control layer manages the logical flow of data from the higher layers to the Physical layer and determines the mapping of the logical channels to the transport channels.

The layer 2 Radio Link Control RLC is responsible for defining different types of data transfer service, namely Transparent Mode, Unacknowledged Mode and Acknowledged Mode, as well as quality of service settings, unrecoverable error notification, ciphering and so on.

The layer 3 Radio Resource Control Layer 54 handles the signalling between the user terminal and the network, including the establishment, maintenance, and release of connections, outer loop power control, ciphering control, timing advance in the TDD mode, user terminal measurement report and evaluation, as well as paging and notifying.

The layer 3 Radio Resource Control layer 54, in conjunction with the Radio Access Bearer function 55, controls the establishment, maintenance, and release of radio bearers for the media session. The Radio Access Bearers are responsible for carrying the media data such as speech or video data.

Lastly, the layer 3 Non-access stratum function 56 controls the transmission of information such as mobility management signalling and call control messages.

A message received in a 3G system will first be received by the physical layer and will flow up through each layer to the third or application layer, where it can be transmitted across the network to the designated recipient. On receipt, the message would flow down through the layers in the opposite direction. These layers are typically provided in distributed elements of the network. For the avoidance of doubt, it will be appreciated that higher levels will typically also lower level functionality. For example, in the Node B, the physical layer will extract the layer 2 information for transmission to the RNC, but will then use a different physical layer to transmit the layer 2 information to the RNC.

In typical 3G systems, the Node B would provide the physical layer, the RNC would provide the layer 2 functionality and the Layer 3 RRC and RABs control, while the MSC or SGSN would provide the layer 3 NAS. In the preferred embodiment all of these functions are contained within the Local Network Node.

The second stack 60 contains an ADSL (Asymmetric Digital Subscriber Line) layer 61, above which are logically situated Internet Protocol functions 62, and User Datagram Protocol 63 in turn. Above the UDP layer are Real Time Protocol (RTP) 64, and Session Initiation Protocol/Session Description Protocol (SIP/SDP) 65

The ADSL block controls the transmission of the digital information on the phone line of the network, according to routing information provided by the Internet protocol block 62.

The Real Time Transport Protocol is an Internet protocol standard that specifies a way for programs to manage the real-time transmission of multimedia data over either unicast or multicast network services. Its functions allow data transmission to be monitored so that packet loss and delay can be compensated for. The SIP block 65, described in more detail in the introduction manages control data.

In turn, both blocks typically rely on the User Datagram Protocol which is responsible for ensuring that a unit of data, called a datagram, is received at the desired destination. UDP is an alternative to TCP and uses the Internet Protocol 62.

A data packet received from the UE at the physical layer 51, passes up through each layer of the first stack in turn. A port number is allocated to a call by the LNN after a connection is set-up, and at each layer the port number and an identifier allow the LNN to keep track of any data packets that relate to the call.

If the data packet is for user data, a Radio Access Bearer identifier is allocated to the data. The call data is then extracted from the Radio Access Bearer at the top of the 3G stack, and input as a new packet into the RTP layer protocol of the IP stack. In doing so, the existing port number may be retained, or a new port number may be generated for the RTP packet. A destination port number may also be added if known (this will be allocated by the network for example, rather than the LNN). IP addresses are also added such as that of the destination network address, or of the LNN from which the signal originated.

Control data on the other hand is extracted from the NAS layer and converted into SIP/SDP messages as described above. This is achieved by the translation method mentioned earlier, relying on mapping messages in the two protocols to each other given the current status of the UE.

Thus, a 3G encoded message from a User Terminal is received by the LNN and converted into an SIP encoded message for transmission to a network. The connection between the LNN and the network, could be either through a wire or cable connection to a dedicated phone line, or wirelessly to a phone line connector.

The decision to encode control messages in SIP, means that for Release 99 networks, conversion back into an appropriate signalling protocol will be necessary. As shown in FIG. 2, this is accommodated in the Release 99 architecture by the SIP/MSC_A 16 through which the LNN connects to the PSTN. The SIP/MSC_A is configured to convert the Session Initiation Protocol commands from the UE 4, which are used to establish a session on an IP network, to the ISDN User part (ISUP/SS7) messages used to manage calls over a PSTN, and vice versa.

The SIP/MSC_A is therefore a part of the preferred system that is provided outside of the LNN in the Release 99 architecture, and even in the Release 5 architecture if desired. Its operation will be understood to be similar to that of the 3G and Internet Processing stacks provided in the LNN except that a SIP message is received and converted into the relevant ISUP/SS7 message for a GSM network. The method will not therefore be explained in detail here. It may also be desirable to provide the SIP/MSC_A as part of the Release 5 architecture.

Thus, where a LNN is installed, the UE will preferably connect to the Release 99 network via the LNN and SIP/MSC_A element 16, and to the Release 5 architecture via the LNN and S-CSCF 30. Alternatively, the UE may connect to the Release 5 architecture via the LNN and the P-CSCF. Which implementation to use is a design choice.

The various protocols described above in connection with FIG. 3, are contained within a central processing unit housed within the LNN. The internal structure of the LNN will now be described in more detail with reference to FIG. 4.

Figure 4:
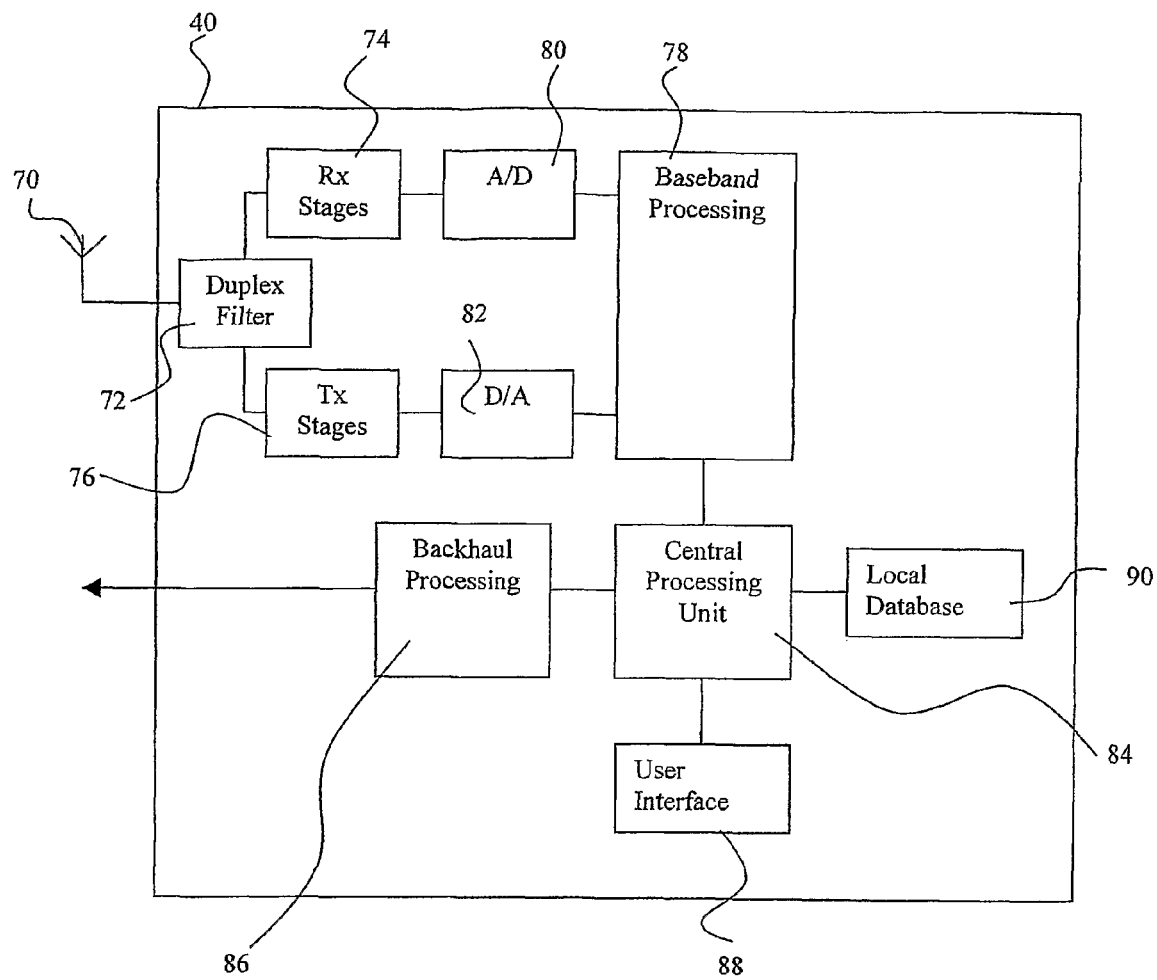
FIG. 4 is a schematic illustration of the principle processing blocks in the local network node according to a preferred embodiment of the invention.

FIG. 4 shows the LNN 40, having an antenna 70, which may be internal or external. Assuming a Frequency Division Duplex (FDD) transmission scheme is used, the antenna is connected to duplex filter 72, which manages the two frequencies used for the uplink from and the downlink to the UE. The filter 72 is connected to separate Receiver and Transmitter Stages 74 and 76 respectively, which are connected to the baseband processor unit 78, by Analogue to Digital Converter 80 and Digital to Analogue Converter 82 respectively. On the receiver side the baseband processor unit converts the received signal identified by the duplex filter into a data signal for presenting to the physical layer and subsequent layers of the first protocol stack 50. On the transmitting side, the baseband processor unit receives a signal from the physical layer and passes this through the duplex filter for transmission at the antenna.

It will be appreciated that if the Time Division Duplex mode is used then the uplink and downlink frequencies are the same, and the duplex filter is therefore replaced by a duplex switch which separates the signals in the time domain.

The central processing unit 84 contains code defining the various level protocols illustrated in FIG. 3 for the User Terminal and Network side 42 and 44. It also contains most of the protocol layers shown in FIG. 3, as well as the code necessary to transform between one protocol and the other at the upper layers of each protocol stack. In the preferred embodiment, this is the look-up table and register described earlier.

Preferably, however the ASDL layer is provided in the backhaul processing unit 86, which also contains the additional functions required to ensure that the ASDL link to the network operates reliably. These will be understood to those skilled in the art and so need not be described here.

The CPU therefore receives 3G digital signals from the baseband processing unit and passes SIP signals to the backhaul processing unit 86, and from there to the network. The central processing unit 84 additionally contains the necessary program code to regulate the operation of the LNN itself, as will be described later.

Connected to Central Processing Unit are User Interface 88, such as a button and screen, allowing selection from a number of control options that may be displayed, and a local database 90 for maintaining a record of subscribing user terminals that may use the services provided by the LNN.

A discussion of how a User Equipment registers with the LNN for network access is provided later in connection with FIG. 9.

The LNN is therefore essentially a complete 3G cellular system. The LNN is a composite of elements of a Node B, an RNC, and MSC, or SGSN/GGSN and P-CSCF depending on which or both of the Release 99 and Release 5 functions are implemented. At the interface to the R99 network, the UE will therefore look like an SIP client that establishes connections to the SIP enabled MSC, using the SIP signalling protocol. The SIP messages are used to transport the signalling messages to the MSC, which then looks like an MSC as far as the remainder of the external network is concerned.

At the interface between the LNN 40 and the S-CSCF 30, the LNN looks like a UE communicating with the S-CSCF through a P-CSCF, or to the P-CSCF directly. All of the messages from the LNN to the S-CSCF and P-CSCF are defined by and conform to the interface defined within the 3GPP specifications. The decision as to which network architecture the LNN will connect to is an operator decision. It may be the R99 architecture, or it may be the R5 IMS architecture.

Additionally, the LNN can operate with other network types, namely wireless networks such as 3G, PABX (Private Automatic Branch Exchange) equipment, standalone networks and a variety of data networks such as LANs and Internet type networks in general.

The term user equipment will be understood to include any device with 3G capabilities, including mobile terminals such as mobile phones, and personal digital assistants, laptops, or other palm-held or hand-held computing devices, as well as typically non-mobile devices such as desktop computers.

The term mobile network will also be understood to refer to any telecommunication network architecture or service provider making a range of telecommunication services available to such user equipment.

Additionally, it will be appreciated that any number of transmission schemes for the air interface between the LNN and the UE could be used. It may be desirable for example to equip the LNN with two antennae so that an antenna diversity scheme could be used.

Various aspects of the operation of the LNN will now be described in more detail.

Registration

One particular aspect of the operation of the LNN that requires managing is the mechanism through which the LNN can decide whether to accept a registration attempt from a specific UE. In the macro cellular network, the HLR is responsible for the ultimate decision as to whether the subscriber is allowed to access the network. The decision is usually based on subscription status and is made after an authentication procedure. If the UE is valid and has the correct subscription, then it will be allowed to access the network.

For the LNN, the situation is slightly different. The LNN coverage area or cell is not a public cell and consequently the majority of potential subscribers will need to be excluded from the use of this cell. To manage this functionality from the macro network would be cumbersome and lead to a great deal of load on the macro network. The preferred embodiment of the LNN therefore, includes a local database or register 90 within the LNN. This database preferably defines the address of the UEs that are allowed to access the LNN. The LNN can then keep track of the allowed LNNs and only permit registration attempts from those that are allowed.

There are two aspects to the operation of the LNN in this regard. In the first aspect, a mechanism in which a master UE is authorised for access to the LNN is defined and in the second aspect a mechanism for controlling the authorisation of subsequent UEs onto the LNN is provided. The LNN may not explicitly require authentication of the UE with the macro cellular network, but that procedure may occur.

In the first aspect, the UE is activated in the vicinity of the LNN. At the same time the LNN is alerted that a UE authorisation is in progress through some appropriate means such as the depression of a button or switch connected to the LNN. The depression of the button or switch will activate the authorisation procedure for the UE that is currently being activated. In turn, the UE will detect the LNN and attempt to register with the LNN. In the process of the registration the LNN can request the International Mobile Subscriber Identity (IMSI) or International Mobile Equipment Identity (IMEI) from the UE and store it in a database as a valid UE.

In the second aspect, the user interface 88 of the LNN allows the presentation of and modification to the registration status of the UEs that are registered with the LNN. This procedure will allow for the identification of specific UEs, the last time the UEs utilised the LNN and the removal of UEs from the database if required.

In the following discussion of the registration process for a user terminal, it will be assumed that the user interface 88 comprises a button for interaction with menu options presented on a screen, such as an LCD display. The LCD is however optional.

Figure 5:
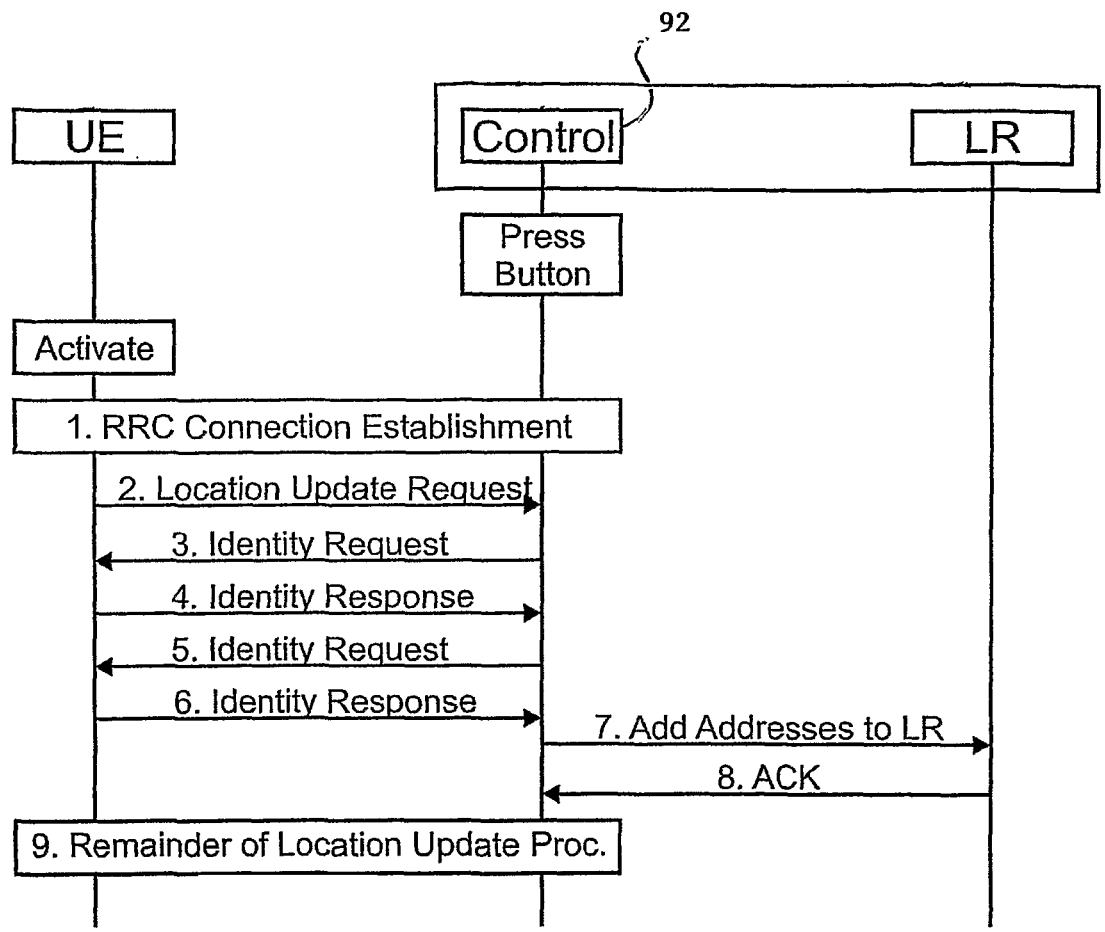
FIG. 5 is a flow chart illustrating the steps taken for User Equipment to register with the LNN.

The User Equipment will be in proximity to the LNN when the registration procedure is activated, and at least within the coverage area of the LNN cell. FIG. 5 illustrates the registration process with the LNN. The button on the LNN 40 is depressed and the UE is switched on and performs its usual activation procedure including a search for PLMNs within the area. The activation of the UE in the area within a specified time period of the activation of the button is taken to indicate that the UE is to be registered as an LNN subscribing user equipment. Alternatively, the UE could be caused to register with the LNN by the user selecting a manual network search option to locate the LNN, and to request registration.

When the UE finds the broadcast channel from the LNN, the UE will attempt to register with the LNN and will follow the further procedures listed below, and illustrated in FIG. 5.

1. The UE requests and establishes an RRC connection to the LNN using its standard procedure;
2. The UE then performs a location update to indicate that it wishes to register with the LNN. The UE will in fact attempt to register with the strongest coverage cell that it detects. If the UE is within the coverage area of the LNN, then the LNN is likely to provide the strongest cell unless the UE is near to the boundary of the cell. In this case, the UE may try and register with a neighbouring macro cell, or with an unauthorised cell. In both of these scenarios, it is possible to provide a mechanism for the user to select which cell to register with.
3. A control function 92, provided in the central processing unit of the LNN then requests that the UE provide its International Mobile Subscriber Identity (IMSI);
4. The UE transmits the IMSI to the control function in the LNN;
5. The control function in LNN requests that the UE provide its International Mobile Equipment Identity (IMEI). As is known in the art, the IMEI indicates the manufacturer and model number of the User Equipment;
6. The UE provides the IMEI for the terminal equipment to the LNN;
7. The control function in the central processing unit in the LNN requests that the Local Database 90 be updated to store the IMSI and the IMEI as identities that are allowed to use the LNN;
8. The Local Register stores the new IMSI and IMEI and acknowledges registration to the control function; and
9. Subsequently, the remainder of the registration procedure continues according to the procedures defined for the UE, with the LNN acting as intermediary. This will comprise the LNN forwarding the registration message to the macro network and the macro network authenticating the UMTS Subscriber Identity Module (USIM) that is present within the UE. The details for this stage of the procedure are defined for the macro networks and the UEs in question and so will not be considered in any greater detail.

Once the registration procedure is complete, the UE is registered on the LNN, and any subsequent requests to use the LNN can be approved by the LNN.

In this way a master UE can be registered. Subsequent UEs can be registered with the LNN and authorised in a variety of ways in addition to the method outlined above. In the second aspect of the invention, the master UE could for example transmit a text or SMS message to the LNN to indicate that an access attempt from a second UE should be authorised, if the second UE is not presently registered. To avoid accidental registration by a UE that is not the intended UE, an authorisation code could be incorporated into the original text or SMS message and transmitted to both the LNN and the second UE. The second UE could then use the standard registration request and incorporate the authorisation code. Such messages might appear in the following formats:

Master UE text message: "register UE 12345";
Second UE text message: "confirm UE 12345".

The LNN would then be arranged to detect both messages and on receipt of the 'confirm' message, to register the second UE in the database. Alternatively, registration of the second UE could be performed, but the details of the second UE deleted from the databases, reversing the authorisation, if the confirm message was not received from the second UE within a pre-determined period of time, such as 1 minute.

Figure 6:
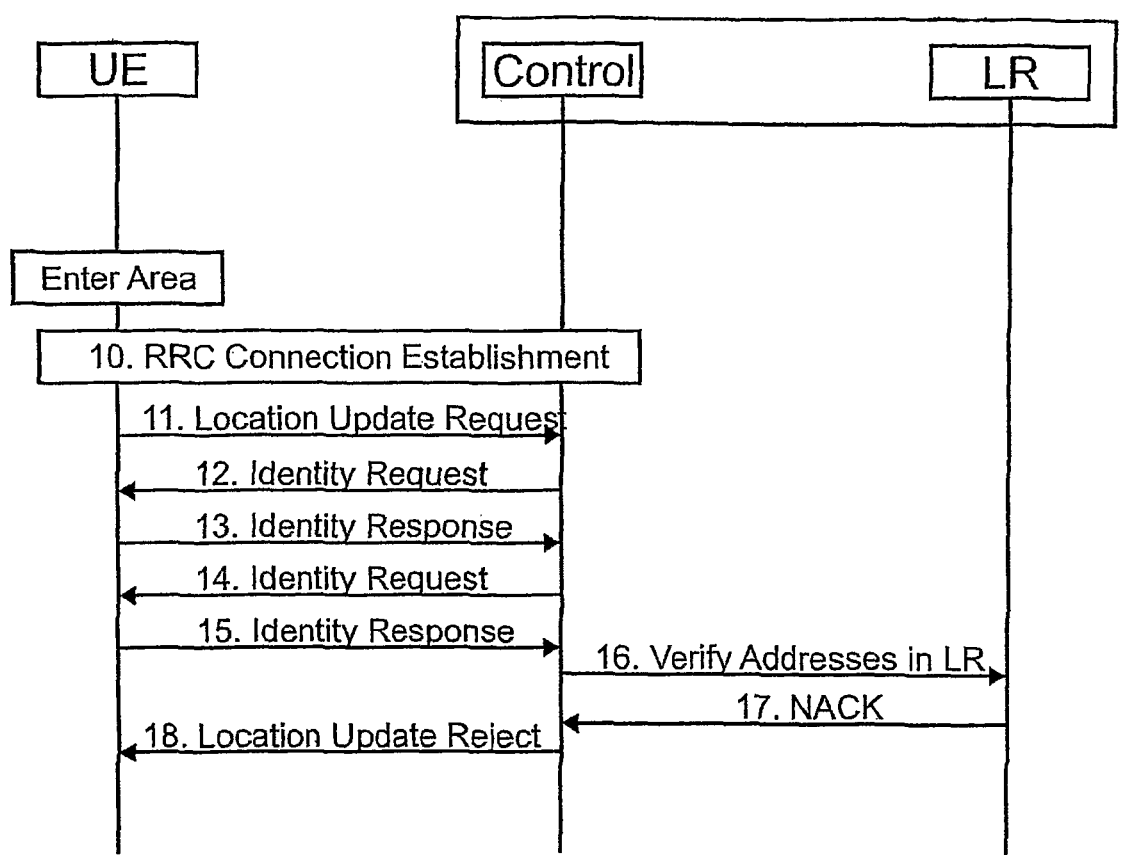
FIG. 6 is a flow chart illustrating the steps that are carried out when an unauthorised User Equipment attempts to access a mobile network using the LNN.

If a UE that is not approved by the LNN attempts to access the LNN, then it will be denied access at the stage when it attempts to perform a location registration. This aspect of the invention is illustrated in FIG. 6 to which reference should now be made. The different processes within FIG. 6 are considered below.

10. Firstly, a visiting UE enters the area served by the LNN, or is activated within it, and selects the LNN for network access. The UE requests an RRC connection from the LNN;
11. The UE requests a location update;
12. The control function in the central processing unit of the LNN requests that the UE provide its IMSI;
13. The UE transmits the IMSI to the control function in the LNN;
14. The control function in the LNN requests that the UE provide its IMEI;
15. The UE provides the IMEI for the terminal equipment to the LNN.
16. The control function verifies whether the IMSI and the IMEI are authorised according to the entry stored in the local registry;
17. The local register indicates that the IMSI and the IMEI are not authorised, and sends a negative acknowledgement (NACK).
18. The control function rejects the location update request.

Thus, only those User Equipment that have been properly registered with the local register are able to use the LNN to access the network.

Without the local registry any valid UE could in theory access the LNN. In many cases, due to restricted resources available and possible billing issues this is not acceptable. The preferred embodiment allows local authorisation of UEs to be achieved, either through the IMSI or through the IMEI or equivalents.

Although, registration of the UE with the LNN was achieved in the example above, by depressing a button, this is purely illustrative. Various other techniques could be used to put the LNN into a state to register the IMSI and IMEI, including any of the many implementations provided within known Graphical User Interfaces or manual interfaces. Additionally, the LNN could actively poll UEs within the coverage area that are not registered and maintain a list of UEs that are present but that are not yet registered. These could then be authorised later by an operator selecting from the stored details which instances are to be authorised and which are not. In order to do this, it might be helpful to include the UE address or telephone number in the register also, so that it can be more easily identified by a human operator. The depression of the button could also occur before, substantially simultaneously with, or even after the activation of the User Terminal.

Additionally, although in the above example registration with the LNN was achieved by pressing a button, and activating the UE within the coverage area, registration could also be achieved by using the manual network search option set out in the 3G protocol to locate the LNN and request registration.

Preferably, the LNN is also provided with the ability to review and modify the contents of the local database via the user interface. An LCD screen (or equivalent) is preferably used to present information to the user. The button can be used on its own or possibly with additional buttons to review and modify contents of the Local registry. A single button may be preferred simply for ease of manufacture and operation.

In a preferred embodiment, the LNN is configured to respond to a user request if the button is depressed for a predetermined period of time (say >2 seconds). This would cause the display to present the list of registered UEs on the LNN and information relating to those UEs such as number of calls made over some defined time period, say one month, the last time a call was made and the duration of the calls. A shorter sharper press, on the other hand, activates the registration procedure for a UE.

Using the button (possibly now with short presses <1 second) the user can then select each entry in the list in turn. If the button is pressed for a long period that will select that entry in the list and present a set of options. These options could include 'delete UE from list', 'reset call and call time counter', 'set a call duration limit for the UE', and so on. A short press will cycle through these options and a long press will select the option. Each option is considered in detail below.

Once the delete UE option is selected for a highlighted UE, a long press will cause the UE to be deleted and return the control function back to the top level of the menu. A short press will move the control function to the next item in the list. Once the reset call and call time counter are selected a long press will reset those counters for that specific UE. After this is completed the user interface returns to the top level in the menu structure.

Once the set call duration limit is selected with a long press, a new sub-menu will appear that defines the call duration limits such as 10 minutes per day, 30 minutes per day, 60 minutes per day and no limit per day. An administrator or operator will cycle through these options with the short press and select the option with a long press. After this is completed the user interface returns to the top level in the menu structure.

In this way, the services presented to the UEs via the LNN can be manually configured by the administrator or operator. The configurations may reflect different levels of authority within the group having access to the LNN, such as employees in a company, or parental-child controls in the home.

This preferred embodiment therefore proposes a method through which the LNN can authorise access to the services provided by the LNN. The authorisation will be controlled through the LNN and will require user interaction to authorise a new UE to access the LNN. The authorisation can be based on the IMSI or equivalent network internal identifier for a subscriber, or it could be the IMEI or equivalent terminal identifier for the equipment used by the subscriber. The former allows the subscriber to use the LNN irrespective of the terminal equipment used, the later authorises the terminal to access the LNN independent of the subscriber using the terminal.

Method of Managing Addresses

In order to allow the LNN to be used flexibly with a plurality of User Terminals, we have appreciated that there may be occasions in which a visiting User Terminal, that is one that is not a subscribing User Terminal, may wish to temporarily access the network via the LNN rather than via any overlapping Node B.

In doing so, we have appreciated that is desirable to manage the call from the visiting terminal as though it was originating from the subscribing terminal. This avoids the need for separate registration of the visiting user terminal with the LNN and the network.

Handling the call in this way, not only allows the call establishment itself to be managed in a more effective way, but also provides advantages from a call usage and billing point of view.

In the normal use of a cellular network, for example, the user is either billed directly to their account, or their calls are debited from a pre-pay account for that user. There are many circumstances, however, where it is beneficial to allow the users to bill calls to a different account.

The following two specific scenarios highlight this requirement. In the first, a user may have an LNN enabled in their home. A second user visits the first user and wishes to make a call using their own cellular phone. The first user offers to allow the second user to make the call via his LNN and to put the call on the first user's account.

In the second scenario, a user could enter a commercial unit such as a retail unit in a shopping area. The retailer may have a special offer allowing the user to download; free of charge a media item such as an audio or a video clip providing that they purchase something from the store. In this scenario, the transaction can then be billed to the account of the retailer.

Furthermore, in environments where the only coverage is provided by the LNN, because no Node Bs provide adequate coverage for example, such an arrangement would allow any user to quickly access the network, without having to 'subscribe' to the LNN. This would save time in establishing a call, and could be critical for safety if emergency services ever need to be consulted. Additionally, as the range to the UE from the LNN is likely to be less than that from the nearest Node B, the data rate of the link between the UE and the LNN can be higher.

At present, there is no easy method of achieving this requirement with the appropriate degrees of security and authentication that are required. It is therefore crucial that any procedure be supported within the current security and authentication procedures defined for the wireless networks such as UMTS.

Figure 7:
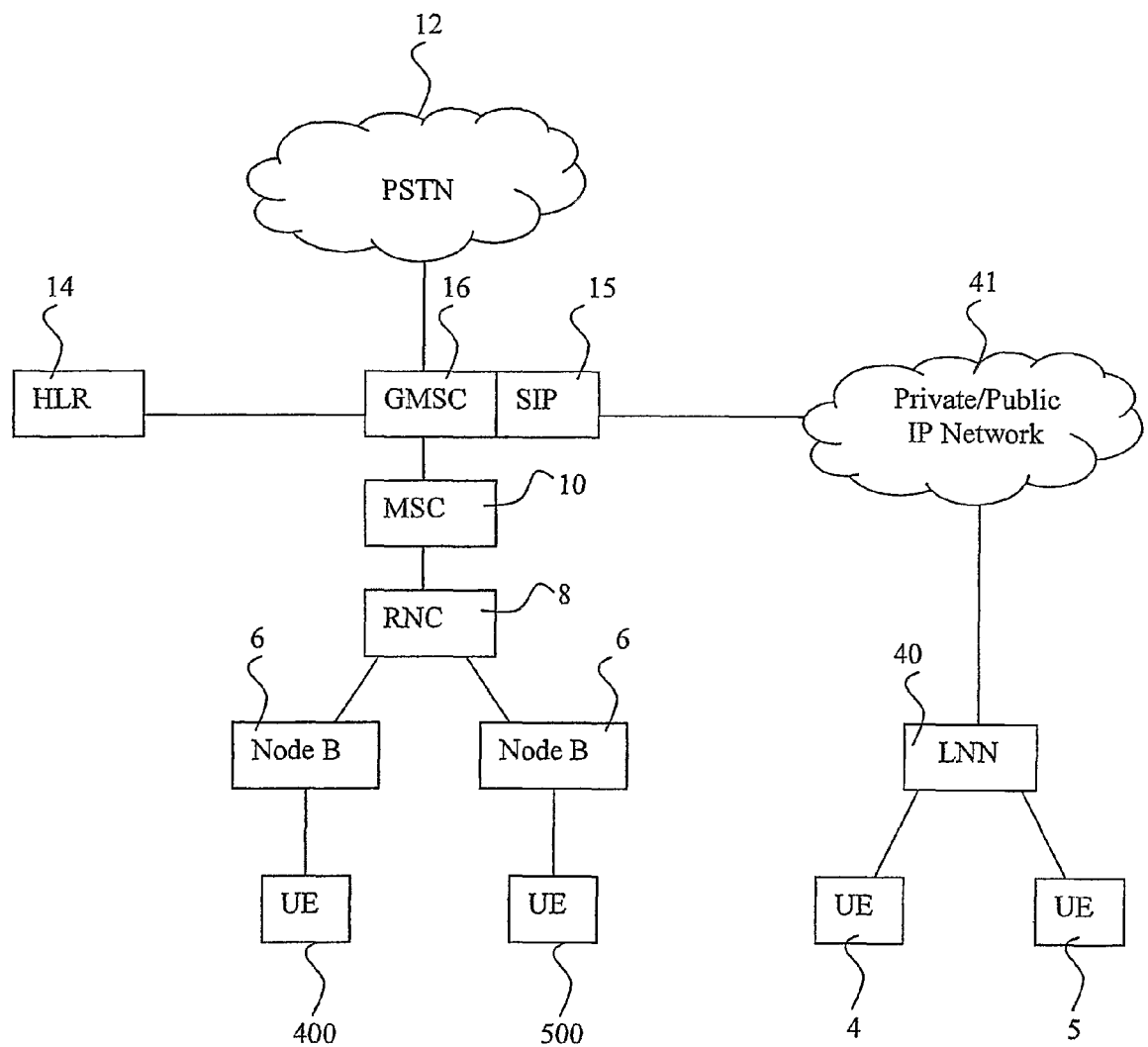
FIG. 7 is a schematic illustration of the configuration of the preferred system set up for Release 99 architecture.
Figure 8:
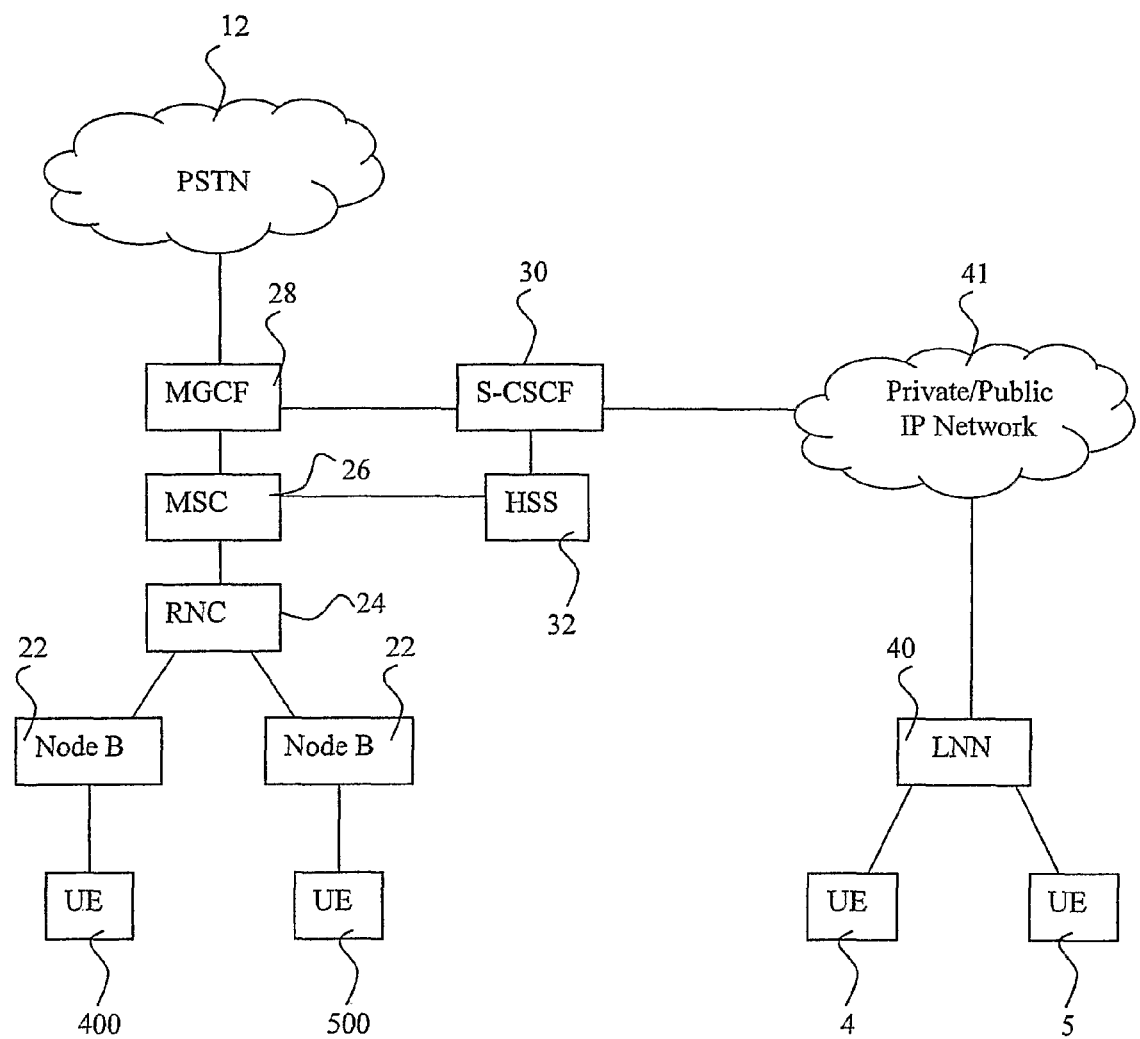
FIG. 8 is a schematic illustration of the configuration of the preferred system set up for Release 5 architecture.

FIGS. 7 and 8, show in detail the configuration of the preferred system, for Release 99 and Release 5 architectures respectively. To some extents these diagrams repeat the content of FIG. 2, and so elements common to both sets of diagrams have been given the same reference numerals.

In FIG. 7, we see part of the network architecture that is likely to be present when the LNN 40 is deployed in a network that attaches to the normal CS network such as GSM. There are two UEs 4 and 5 shown as attached to the LNN 40. This means that both have connected to the LNN in the usual way to receive network services. UE 4 will act as the master UE. This UE could be separate to the LNN 40, or integral to the LNN 40 either whole or in part. The other UE 5 will be that of a visitor that wishes to access the external network via the LNN. In this scenario it is assumed that all of the UEs within the coverage area have access to the LNN irrespective of the registration procedure described above.

The LNN is linked to the SIP interface 15 of the GMSC 16 via a public or private IP network 41. In FIG. 2, the GMSC is referred to as the SIP/MSC_A. However FIG. 7 shows this element in more detail and as comprising two separate parts. The GMSC 16 is linked to the home location register (HLR) 14, the PSTN 12 and the MSC 10 (MSC_B). The MSC is in turn linked to the radio network controller 8 which is linked to numerous Node B 6. Numerous UE 400 and 500 are shown as linked to the Node Bs.

In FIG. 8, the case where the LNN is arranged to access a Release 5 IMS network is illustrated. The main difference between FIG. 7 and FIG. 8, is that the GMSC 16 and SIP entity 15 have been replaced by a Serving Call Session Control Function (S-CSCF) 30, (or P-CSCF) and a Media Gateway Control Function (MGCF) 28. The HLR 14 is absorbed into the Home Subscriber Server (HSS) 32.

To explain this aspect of the preferred system, we will consider two examples. The first example will be a sequence of message flows that apply to the architecture illustrated in FIG. 7, and the second example will be a sequence of message flows that apply to the architecture in FIG. 8. The preferred embodiment relies on many messages that exist in present systems, with the changes necessary in order to produce the desired functionality being highlighted in the discussion below.

Figure 9:
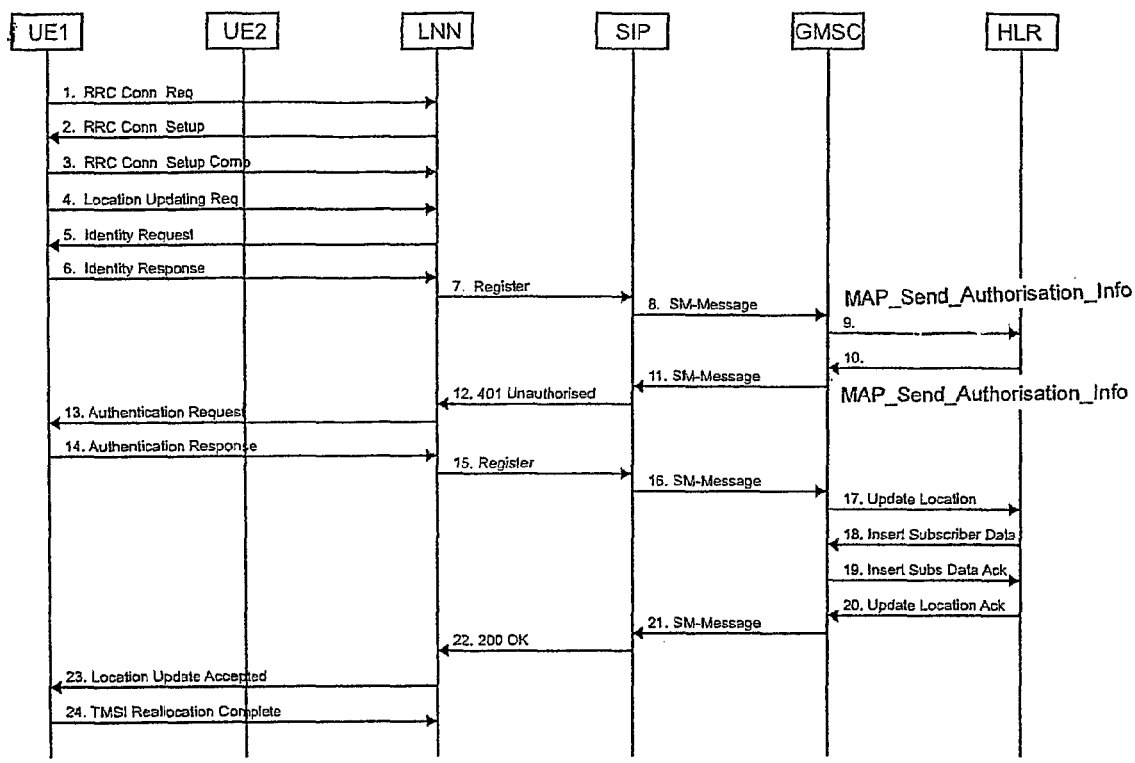
FIG. 9 is a flowchart illustrating the registration procedure for a first User Equipment in a Release 99 architecture.

We shall now consider FIG. 9, which illustrates the registration process for a first User Equipment 4 with the LNN, for registering and requesting service from a network based on GSM technology. The first UE 4 may be the main UE as far as the LNN is concerned, and the one against which any call charges will be made by any subsequent UEs joining the network, such as UE 5.

FIG. 9 shows the messages in numerical sequence, with the numbers given in the figure corresponding to the numbered paragraphs set out below.

1. Initially, the UE detects the LNN by scanning the common channels (such as the Synchronisation channel and the Primary Common Control Physical Channel). On detecting the LNN, the UE forms a RRC Connection Request message, indicating that the UE wishes to make a connection with the LNN, the nature of the connection, an initial identity for the UE, and measurements of neighbouring cells in the vicinity of the LNN. This message is transmitted to the LNN which stores the UE identity, and measurement data for future use.

2. The LNN responds to the UE, by sending an RRC Connection Set-up message, defining the type of connection allocated. The message is sent to the address from which the UE message was received, and a temporary address is allocated to the UE by the LNN for future use.

3. On receipt of the message, the UE sends an RRC Connection Setup Complete Message, indicating that the message was correctly received, and defining the conditions for any security algorithms.

4. The UE 4 requests a location update. The location update will be used to register the UE on the LNN and the GMSC 16. The message is the standard LOCATION UPDATE REQUEST message defined by 3G protocols, and includes any old temporary mobile subscriber identity (TMSI) and old location area identifier (LAI) that were used by the UE previously in the macro-network, or alternatively in the LNN if the UE was last connected to the LNN.

5. If the LNN 40 does not recognise the TMSI from the UE 4, then the LNN can request the IMSI of the UE to be sent to the LNN. This is needed because the LNN does not have a direct connection to the normal cellular network. It will be appreciated that in a normal macro cell network, a new MSC could recover the IMSI of the UE from the old MSC, based on the TMSI that the UE had been allocated by the previous MSC. Although it is possible to arrange for the GMSC to retrieve the IMSI, in this case, we assume that LNN does not have direct access to the old MSC. As a consequence, the LNN is configured to request the IMSI from the UE rather than from the network.

To do this, the LNN sends the IDENTITY REQUEST message. Although, this message is standard, its use in this context is not. Ordinarily, the message would be used in the macro-network when the temporary identity allocated to the UE has been lost.

6. The UE responds to the IDENTITY REQUEST message with the IDENTITY RESPONSE containing the IMSI for the UE, and in turn the LNN stores the IMSI in the local database for future use.

7. With the IMSI obtained from the UE, the LNN 40 now registers itself with the SIP entity 15 and the GMSC 16. The IMSI is transferred in the standard SIP REGISTER message as the private user identity that is defined in TS23.003. An IMSI is made of a 15 or 16 digit number comprised of a 3 digit mobile country code (MCC), a 2 or 3 digit mobile network code (MNC) and a 10 digit mobile subscriber identity number (MSIN).

An example IMSI could be: 234150123451234, indicating that the MCC is 234 and the MNC is 15. The SIP private user identity, according to TS23.003 would then become:

234150123451234@ims.mnc015.mcc234.3gppnetwork.org

The IMSI is therefore included within the SIP register message within the Authorization header field.

In registering in this way, the LNN becomes a point of connection between the 3G system directed to the UE, and SIP driven network architecture, such as the Release 5 architecture. In the Release 99 architecture case, the SIP entity or interface extracts the relevant data from the SIP message and passes it to GMSC 16.

Converting the 3G message into SIP messages provides adaptability and compatibility, as a single LNN unit can be provided for any type of IP network. In the case of Release 99 architecture networks, all that is then needed is an additional module forming the SIP interface attached to the GMSC. Translating the SIP message into a format that the GMSC can understand is achieved in the manner described above for the LNN, by maintaining a mapping of SIP messages to GSM messages given the present status of the connection.

8. The relevant contents of the REGISTER message, such as the IMSI, MNN and MNC are transferred from the SIP interface to the GMSC by converting the SIP message to the appropriate GSM message. This is carried out in the same way as for the conversion between protocols in the LNN. The conversion is expressed here in terms of an internal SIP to MSC Message (SM-message) signalling procedure. The most important field will be the IMSI.

9. Having received the information about the subscribing UE from the LNN, the GMSC entity 16 then retrieves the security parameters for the UE from the HLR 14, using the standard 3G MAP_SEND_AUTHORISATION_INFO message.

10. In response, the HLR 14 creates a set of authentication vectors, set out in step 11, for the UE 4 and sends them to the GMSC 16 also using the MAP_SEND_AUTHORISATION_INFO message.

11. The GMSC 16 translates the received security parameters to the SIP interface 15 using the SM-message.

If a high degree of security is required in the network, the authentication response RES from the HLR can be retained in the GMSC, as there is no need for it to be transmitted the LNN. Other parameters, such as cipher key CK, integrity key IK, authentication token (AUTN) and the random number RAND will all need to be transmitted to the LNN 40, and the RAND and AUTN will need to be further transmitted to the UE 4.

12. The SIP interface 15 indicates to the LNN 40 that the registration request has not yet been successful by sending a '401 Unauthorised' response to the LNN. The authentication vector will be returned within the response to the LNN.

This procedure is similar to that in most SIP networks that require registration. The first message from the LNN will include the identity information for the UE, but does not include the response (RES) from the UE. This is a 128 bit number that is generated by the UE. As a consequence the UE cannot be authenticated in the first pass. In the second attempt the UE receives the authentication information from the HLR via the LNN and can then generate the correct response that is sent back to the GMSC.

13. The LNN 40, subsequently, extracts the random number parameter (RAND) and the authentication token (AUTN) from the 401 response and sends them to the UE 4 in the form of a 3G AUTHENTICATION REQUEST message.

14. The UE 4 will process the contents of the authentication request message, authenticate the network, check the message integrity and compute a response (RES) that is to be returned to the LNN 40 in the AUTHENTICATION RESPONSE.

15. The LNN 40 recreates the register message but on this occasion includes the RAND, AUTN and RES so that the network may authenticate the UE 40. The data is passed to the SIP interface 15 in the Authorization header field within the register message.

16. The SIP interface 15 passes the authentication data to the GMSC 16, in the same way as for step 8 above. The GMSC then compares the response from the UE 4, with the initial response from the HLR 14 in step 10. If they are the same then the UE 4 is deemed to be authentic and the registration may proceed.

17. The registration procedure then continues with the standard 3G Update Location message in which the GMSC 16 updates the HLR 14 as to the location of the UE 4. The HLR transfers the subscription data for the UE to the GMSC.

18. The HLR transmits the Subscriber Data for the UE to the GMSC.

19. The GMSC acknowledges the receipt of the subscriber data.

20. The HLR acknowledges the receipt of the Update Location request.

21. An indication of the registration success is then passed from the GMSC 16 to the SIP interface 15. The temporary mobile subscriber identity (TMSI) is created by the GMSC and passed to the SIP interface along with the location area identity (LAI).

22. The SIP interface 15 passes the TMSI and the LAI to the LNN 40, in the form of a '200 OK' response indicating that the register message was a success. The SIP entity could also include an Expires header in the message for example to indicate the time duration of the registration should this be desired.

23. The LNN 101 converts the SIP message into a 3G message as for the steps above, and forwards the registration success, the new TMSI and the LAI to the UE 4 using the 3G LOCATION UPDATE ACCEPT message. The UE will store the TMSI and the LAI for use later.

24. Lastly, the UE acknowledges the assignment of the new TMSI to the LNN 40 with the TMSI REALLOCATION COMPLETE message.

The first user equipment 4 is then registered via the LNN with the network, and can use the various multimedia services specified in the HLR.

Figure 10:
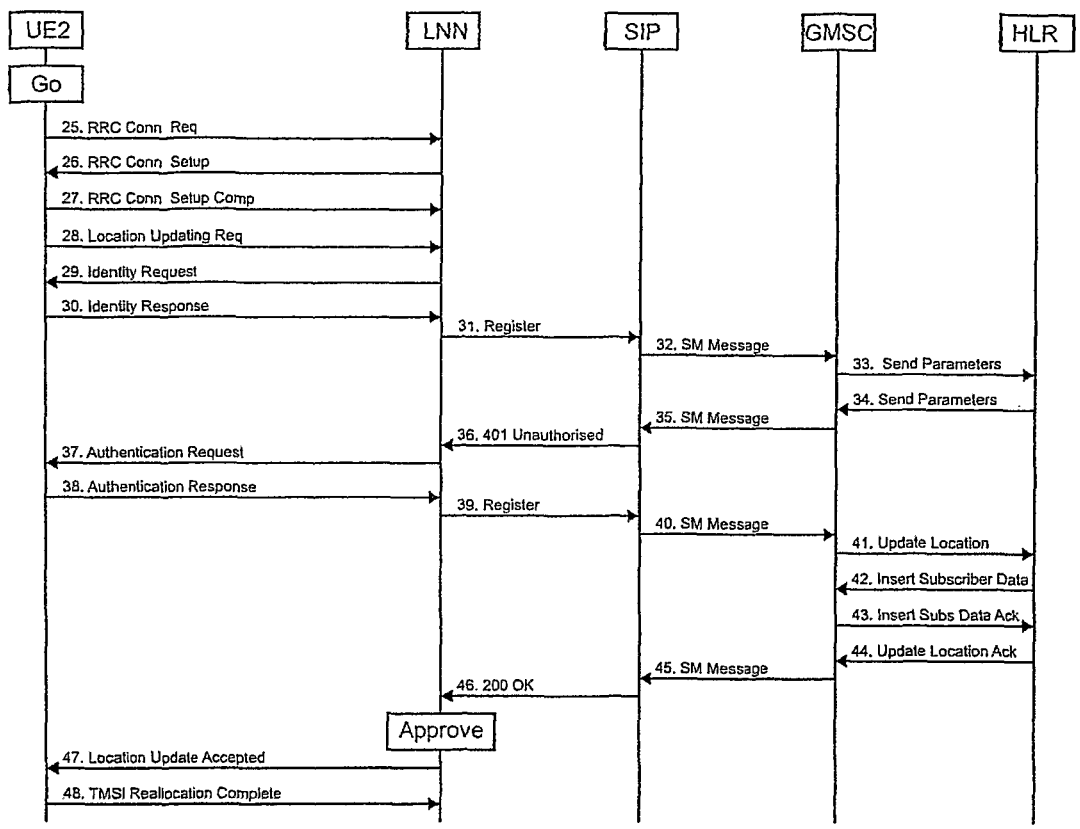
FIG. 10 is a flowchart illustrating the registration procedure for a second User Equipment in a Release 99 architecture.

With reference to FIG. 10, we shall now consider the registration and authentication of a second UE 5. The procedure will be broadly the same as in the previous example, but will differ at least at the point when the TMSI is allocated and in the address given to the UE.

The decision on what TMSI to assign the second UE is made by the LNN in order to organise the account to which the call charges are made. A UE that requests a service such as a speech connection from the LNN will need a port number from the LNN for communication between the LNN and UE to take place. The media stream from the LNN is then sent via an IP/UDP/RTP connection from the LNN to the GMSC.

Preferably, the TMSI is assigned to the UE in such as manner that the port number allocated to the UE will be defined in part by the TMSI. The LNN therefore assigns 10 bits of the TMSI to represent the port number, leaving the remaining 22 bits to be randomly generated. The 32 bit TMSI will then look like:

TMSI=[22 random bits] [10 assigned bits]

The UDP port number will also need to be assigned to the UE at a later point. Preferably, the 16 bit UDP port number is assigned as follows by the LNN:

UDP port=[1][10 assigned bits from TMSI][5 bits derived from RAB-Id]

The 5 bits derived from the RAB-Id are given by:

5 bits=2*(RAB-Id−1)

The RAB-Id is typically represented as a four bit number, and identifies for a particular media stream the Radio Access Bearer that will be used. The additional port number are included to allow for the Real Time Control Protocol (RTCP) that will usually take the next adjacent port number to the RTP port number.

Using this approach, we are able to associate the TMSI to the port number, and assign up to 1024 TMSIs per LNN. Such a large number is well in excess of the LNN capabilities, as well as the capabilities of the other signalling protocols. Additionally, the port number is implicitly defined by the TMSI and the RAB-Id for the specific service.

The LNN will maintain the association between the GMSC assigned TMSI and the LNN assigned TMSI, using a look-up table stored in the local database for example.

The purpose of assigning a local TMSI is to coordinate the allocation of TMSIs to the port and media stream defining parameters for the UE This allows the two groups of information TMSI, and Media Stream parameters to be handled more efficiently avoiding the need for a look-up table and processing to keep track of the TMSIs for each UE. This provides a simple method of associating port numbers to the TMSIs.

We shall now assume that the user wants to register UE 5 with the network via the LNN 40. To activate the procedure the user will need to trigger a RRC connection request as shown in the initial steps of FIG. 9, to register with the LNN. Any existing connection to an overlapping node B will be terminated during this procedure and the UE will no longer be reachable via the macro network. This could be achieved by selecting a "Go" option from the UE user interface provided in the UE. The 'Go' option would activate a program written in a suitable language such as the USIM Application Toolkit (USAT) or Java. The program itself could be sent to the user from the LNN operator, in a manner similar to the way in which ringtones and background pictures are sent to current mobiles. Activating the Go program however causes the registration procedure to begin.

Alternatively, the UE could be made to perform a manual PLMN selection, forcing the UE to perform a location update.

Steps 25 to 46 of FIG. 10, are therefore essentially the same as stages 1 to 22. described previously for UE 4. Differences will arise in the actual data being transmitted due to the different IMSI, different authentication vectors and different TMSI being assigned for the second UE.

After the '200 OK' is received by the LNN 40 in step 46, either the LNN or the master user UE 4 can confirm whether the registration for UE2 5 should proceed. The mechanism for obtaining confirmation from the UE 4 will not be discussed in detail here, but could rely on the use of the SMS service, an activation of a PDP context or a Java applet being triggered, to transmit information between the LNN and the UE. Such messaging options are well known in the art. The mechanism does not affect the basic principles for this invention.

For confirmation to be provided from the LNN, a special button or menu option on a graphical user interface could be provided.

47. Assuming the user via UE 4 approves the registration, the LOCATION UPDATE ACCEPT message is passed to the second UE 5 by the LNN. However. instead of passing the TMSI assigned by the GMSC 16, The LNN passes the TMSI created by the LNN itself.

48. The UE 5 confirms the receipt of the new TMSI with the TMSI REALLOCATION COMPLETE message.

To recap, at this stage, the first UE has a TMSI received from the GMSC on the network, while the second UE has received a TMSI allocated by the LNN locally.

Figure 11:
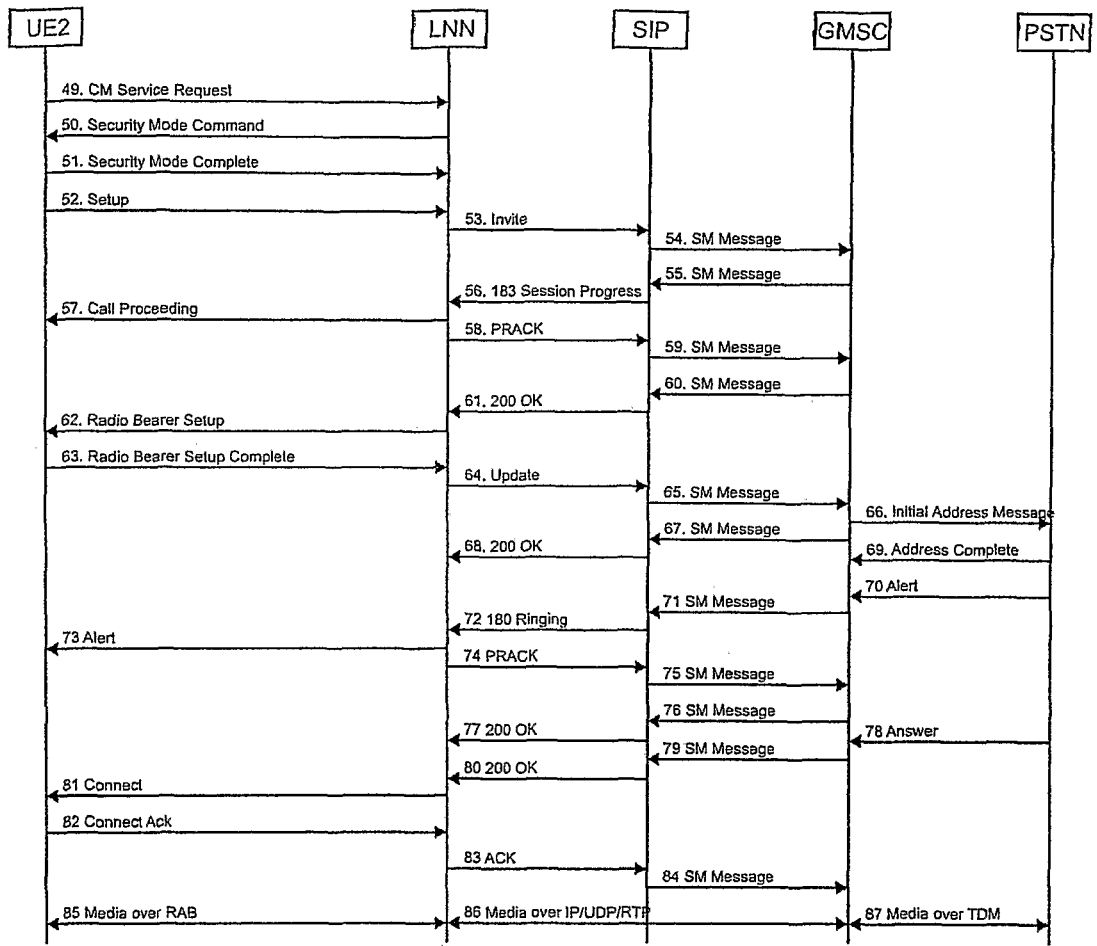
FIG. 11 is a flowchart illustrating the procedure for establishing a call between the second User Equipment and a PSTN in a Release 99 architecture.

Referring now to FIG. 11, we shall consider the message flows that occur to establish a speech call between the second UE2 5 and the PSTN 12.

49. The second UE 5 requests the establishment of a multimedia MM connection. This allows a signalling connection between the UE and the GMSC 16 to be created and allows the establishment of a speech connection. This is achieved through the transmission of the CM Service Request. The second UE includes the TMSI allocated by the LNN, in the normal way, allowing the LNN to identify which UE is requesting the connection.

50. The LNN 40 sends the SECURITY MODE COMMAND message to the second UE 5, and in step 51 receives the SECURITY MODE COMPLETE message in response. These two messages are used to activate integrity protection and optionally the encryption between the UE 5 and the LNN 40. The integrity protection will use security keys that were derived by the UE.

52. The UE 5 sends the SETUP message that defines the specific service requested. This is sent to the LNN 40. The SETUP message defines the Stream Identifier for the media session, which will be used by the LNN later to assign an RAB-Id.

53. The LNN 40 extracts the appropriate information from the SETUP message to create an INVITE message. The INVITE request is a message that is defined in an Internet Engineering Task Force standard, and which is used to initiate a media session. The format of a typical message is shown below.

INVITE sip:top_twenty_hits@some_network.com SIP/2.0
  Via: SIP/2.0/UDP UE4@lnn_network.com;branch=z9hG4bKnashds8;received=193.10.21.1
  Max-Forwards: 70
  To: Music Download <sip:top_twenty_hits@some_network.com>
  From: UE4 <sip:UE4@lnn_network.com>; tag=4921211732
  Call-ID: 23a56bc2ef
  CSeq: 314160 INVITE
  Contact: <sip:UE4@lnn_network.com>
  Content-Type: application/sdp
  Content-Length: 142

The above parameters are followed by SDP parameters, which define terms such as the media types, the required bandwidths, port numbers, transport protocol and so on.

For the 'from' address of the INVITE message, the IMSI of UE 4 is used since this is the master UE for the purposes of the example, and not the IMSI of UE5 that is requesting the connection. This will ensure that the connection belongs to the master UE, and secondly that the billing for the connection is charged to the account of UE 4 and not UE 5. On the other hand, the rest of the invite message contains the necessary connection data such as TMSI, Port number, UDP and RAB data to route the call to the second UE not the first. This is not shown explicitly above, as these parameters are included in the SDP portion of the message. At least the port number of the second UE is required to be included in the message to ensure that the data is routed to the correct final location.

The SDP parameters within the INVITE message define the media parameters such as the UDP connections that are to be used for the media. The port number for the UDP connection will be derived from the Stream Identifier sent in the SETUP message and the lower 10 bits of the TMSI as outlined above. The Stream Identifier will be returned at a later stage by the GMSC 16 as the RAB-Id for the media stream. The IP address used by the LNN for all users and their media streams can be the same, only the port number will need to be different.

54. The SIP interface 15 forwards the contents of the INVITE message to the GMSC using the SM-MESSAGE described earlier in step 8, and in step 55, an acknowledgement is sent from the GMSC to the SIP interface.

56. The SIP interface then generates a standard '183 Session Progress' response, containing the necessary information from the GMSC 16 to define the media stream from the GMSC perspective. This will include preferred media types, IP address for the media stream at the GMSC and port numbers.

57. The CALL PROCEEDING message is passed to the second UE 5 indicating that the call is going ahead.

58. A 'Provisional reliable acknowledgement (PRACK) is then sent from LNN 40 to SIP interface 15.

59, 60 and 61. The SIP interface 15 notifies the GMSC 16 that the call is proceeding using an SM message of the type described above. The GMSC acknowledges the notification and requests the establishment of a Radio Access Bearer RAB for the media stream. The SIP interface returns '200 OK' in response to the PRACK message of the LNN.

62/63. The RAB is subsequently created by LNN and notified to the second UE. The RAB-Id allocated will be the same as the Stream Identifier in the SETUP message received from the second UE in step 52. It may be used to define the port number as defined previously. In step 63, the UE transmits a 'Complete' message to the LNN indicating that it has completed the setup of the Radio Bearer.

64/65. The LNN transmits an UPDATE message sent to GMSC via the SIP entity, indicating that the RAB resources are available from the UE to the LNN.

66. An Initial Address Message is then sent from GMSC 16 to PSTN 12, indicating that the call is going ahead, and the destination part of the call is commencing.

67/68. An 'Acknowledgement' indicating the receipt of the UPDATE message is sent to LNN from the GMSC via the SIP interface

69 to 73. The address complete message is then sent from the PSTN 12 to the GMSC 16, and subsequently the Alert message. This is converted into the 180 ringing message for transmission to the LNN, which is in turn transmitted as a 3G Alert message to the UE 5.

74-77. The PRACK message transmitted from the LNN reliably acknowledges the 180 Ringing to the SIP interface 15, which communicates with GMSC to return a 200 OK message in step 77.

78 to 84. The Answer message is received by the GMSC across the network from the destination of the call, such as a UE similar to UEs 400 and 500, and sent to the UE via a '200 OK' from the SIP interface to the LNN, and via a CONNECT from the LNN to the UE. The UE acknowledges with the 'CONNECT ACK' which is sent to the GMSC via the SIP ACK.

85 to 87. The media session is now initiated and media, such as voice data, now flows through the connection defined by the SDP parameters in the initial INVITE and the subsequent 183 session progress messages. From the second UE, the media passes via a RAB to the LNN, then via an IP/UDP/RTP connection to the GMSC, and then through the GMSC to the PSTN via a Time Division Multiplex (TDM) connection.

The call is then active, and the data will flow between the second UE 5 and the PSTN 12 via a connection that belongs to the master UE 4. Since the identity of the master UE was substituted into the INVITE message, the billing information collected will relate to the registration of the master UE 4 and not the second UE 5.

Meanwhile the substitution of the locally assigned TMSI for the second UE for that received from the GMSC allows the LNN to easily process the connection data for the second UE. By specifying the port number in the TMSI, the LNN does not need to lookup the port number in order to manage the call, as the address can be obtained from the TMSI. This avoids the need for a lookup table and makes the implementation of the LNN more efficient.

Figure 12:
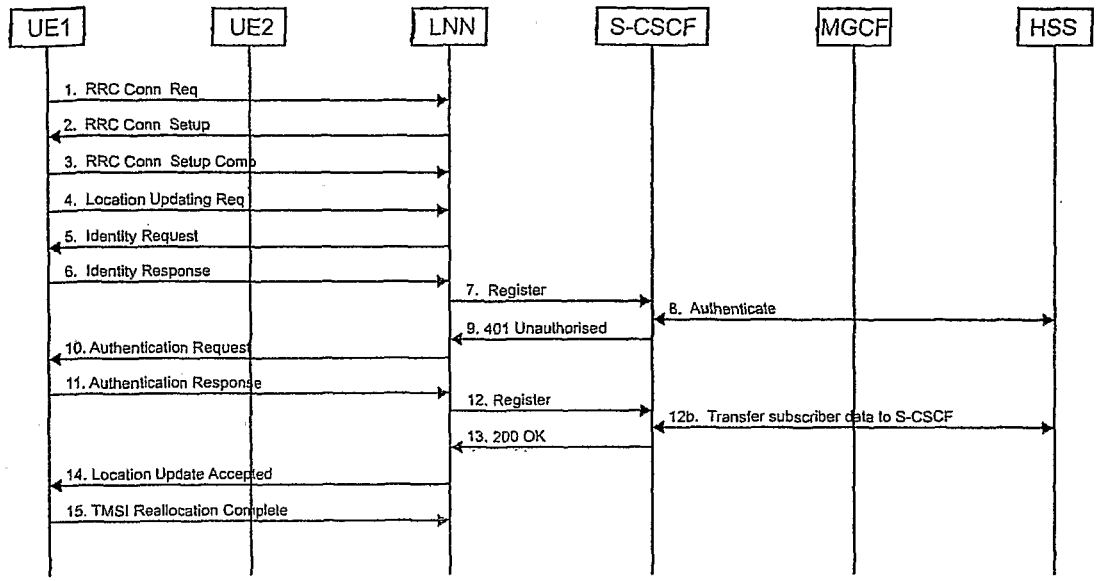
FIG. 12 is a flowchart illustrating the registration procedure for a first User Equipment in a Release 5 architecture.
Figure 13:
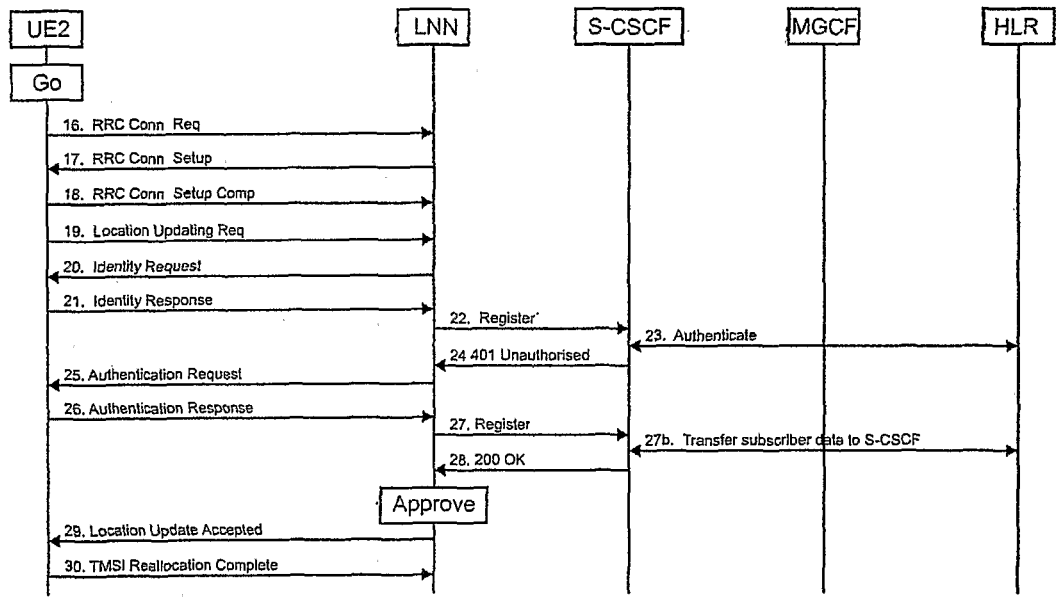
FIG. 13 is a flowchart illustrating the registration procedure for a second User Equipment in a Release 5 architecture.
Figure 14:
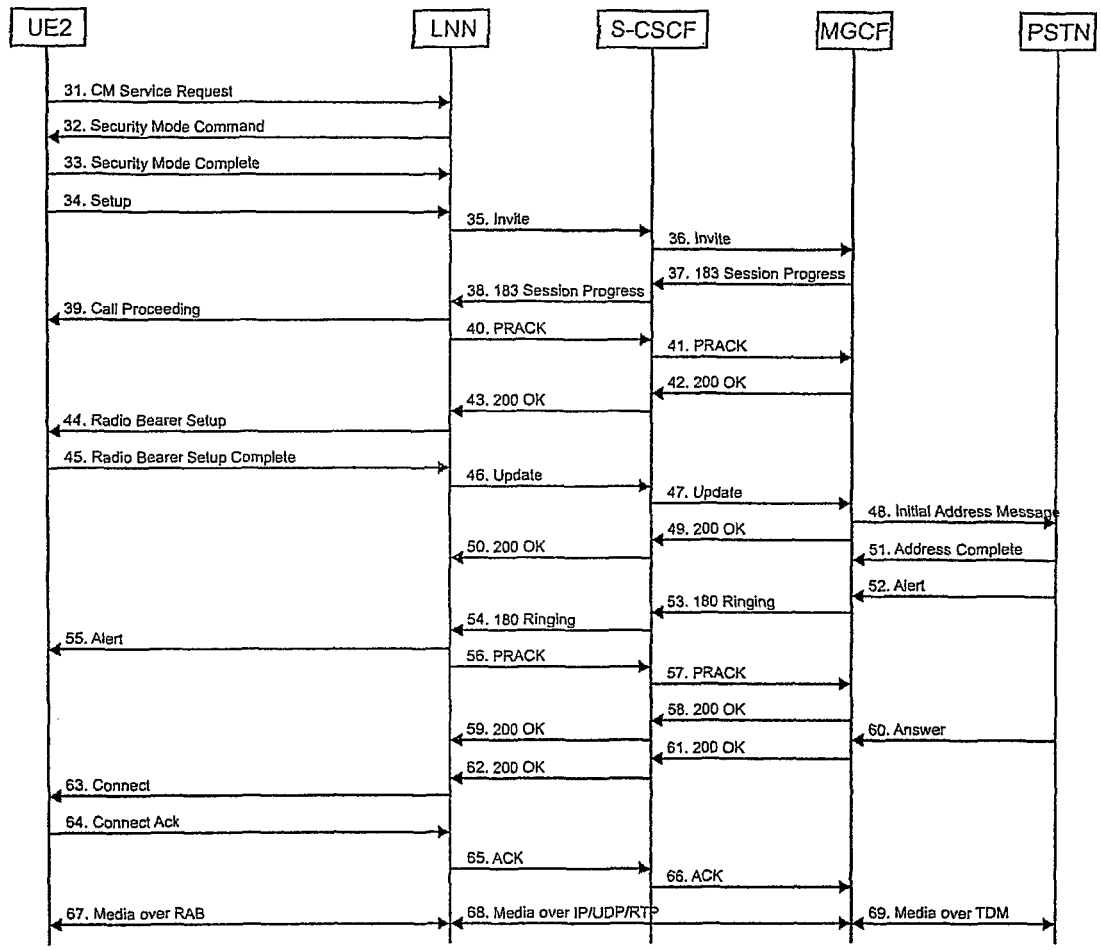
FIG. 14 is a flowchart illustrating the procedure for establishing a call between the second User Equipment and a PSTN in a Release 5 architecture.

FIGS. 12, 13 and 14 show the corresponding arrangement assuming that Release 5 architecture is being used. The basic mode of operation is the same as described above for FIGS. 9 to 11.

In the following we will focus on the differences between this embodiment and the previous one and also the key aspects of the invention. The stages where the messages are essentially the same as in the first embodiment we refer to that embodiment directly.

Steps 1 to 7 are therefore identical to steps 1 to 7 above.

8. The authentication procedure within the IMS is defined in TS24.228, and uses the DIAMETER protocol defined by IETF. The S-CSCF 30 receives an authentication vector from the HSS 32 based on the address of the UE. In this case, the same procedure is used to define the UE IMS private user identity based on the IMSI as defined in step 7 above.

Steps 9 to 12 are then identical same as steps 12 to 15 above.

12*b*. The S-CSCF confirms that the UE is authentic and requests the HSS to transfer the subscriber data. The subscriber data could include a number of public SIP user identities for the UE. It will depend on the configuration in the HSS. These multiple public identities could be allocated later to the users requesting a temporary identity for service, or a single public identity could be used with the port numbers being used to differentiate as before.

Steps 13 to 15 are identical to steps 22 to 24 above. The master UE is then registered with the LNN and network.

FIG. 13 shows similar steps (steps 16 to 30) as FIG. 10, except for differences in how the elements within the network interact. For example, no SIP interface or GMSC are required meaning that the SM messages can be omitted. The TMSI that is allocated to the UE 5 in step 29 above will be the same in principle as before.

FIG. 14 embodies the same principles and messages as defined in FIG. 11. The principle difference being the messages between the S-CSCF 30 and the MGCF 28 replacing the messages from the SIP interface 15 and the GMSC 16.

In the description above, the UE 4 has been described as separate to the LNN 40. In alternative embodiments, it is possible that the UE 4 be integrated into the LNN either totally, or in part. Specifically, the USIM of the UE is required, as this is used to authenticate UE1 4 and assign network addresses to be used subsequently. This allows the LNN and UE 4 to be located in stores, where the UE 4 will act principally as the logical terminal for the call, rather than being used as the physical handset itself.

Call Handover

In typical PLMNs, as described above, the users and their UE move through the network and the mobility of the user is typically managed through procedures often referred to as handovers (such as in GSM) or relocations (such as in 3G). We shall refer to them here generically as handovers. Through a handover the connection between the UE and the basestation may change possibly to a new basestation or to a new frequency on the same basestation.

There are many forms of handover defined, some examples being defined in 3GPP TS 23.009. According to TS23.009 handovers that use the same MSC before and after the handover are referred to as intra-MSC handovers (SRNS relocation in 3G), and those that use different MSCs before and after are referred to as inter-MSC handovers (inter-MSC SRNS relocations in 3G).

To accommodate a user leaving or entering the coverage area provided by the LNN, we have appreciated that it would be desirable to allow a handover to take place between the LNN and the MSC or SRNS of the overlying network.

In a network without the LNN this could be achieved simply through the use of handovers between cells, implemented in part by cell control functions such as the BSC in GSM, or the RNC in UMTS.

With the LNN, however, there is no direct access to these entities as the LNN connects directly to the core network, and consequently the call transfer cannot be implemented through the handover mechanisms described above.

The LNN, according to the preferred embodiment, therefore allows the modification of SIP messages that will be exchanged between the LNN and the core network.

For a conventional inter-MSC SRNS relocation between different core network entities, a number of messages are exchanged. Examples of these messages are defined in TS23.009 and TS29.002 for the inter-MSC SRNS relocation. The messages are based on the use of the RANAP and the MAP protocol defined in TS25.413 and TS29.002 respectively.

By making additions to the SIP message exchanges that flow between the LNN and the SIP/MSC_A, it is possible to allow the incorporation of the messages that are defined in TS25.413, TS23.009 and TS29.002 for the inter-MSC SRNS relocation. Through this procedure it will be possible to transfer the connection from the LNN to another MSC within the core network.

In this description, we will consider a PLMN that is defined according to the 3GPP specifications. Other types of PLMN exist for which the procedure outline below could also be used. The differences are in the names applied to the messages, not in the principles that lie behind the transfer of the messages.

Figure 15:
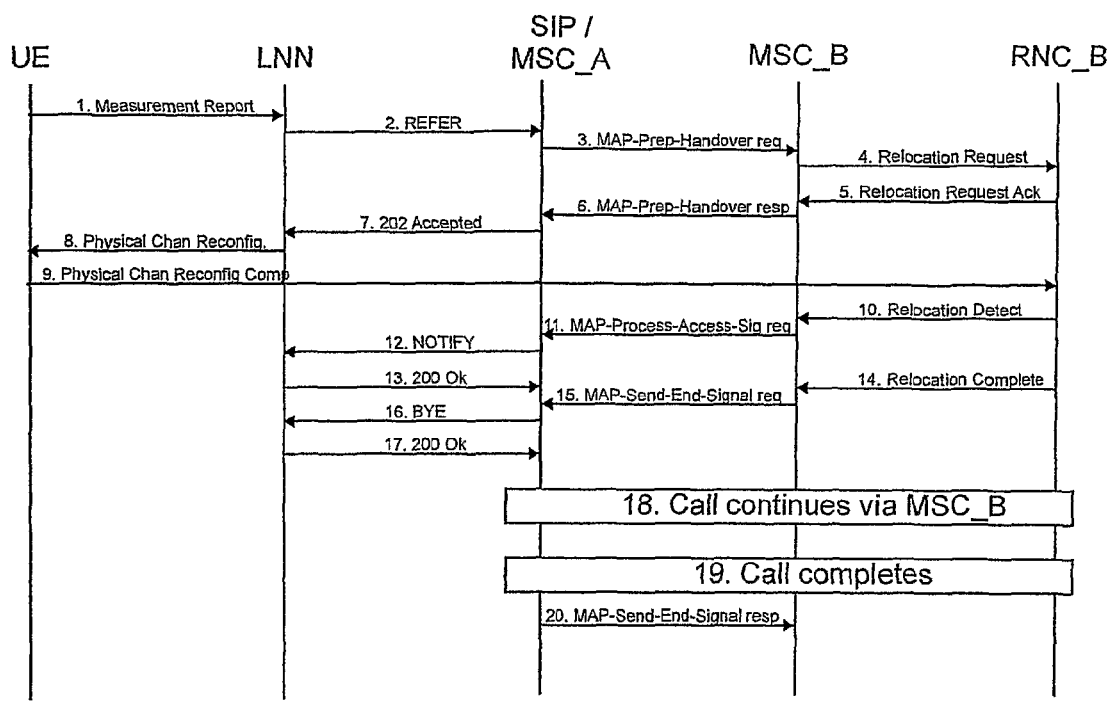
FIG. 15 is an illustration of a call handover method according to a preferred embodiment of the invention.

Reference shall now be made to FIG. 15 which illustrates the message flows between the LNN and the Release 99 macro network permitting the mid-call mobility desired. Note that the SS7 signalling messages between the MSC_A and MSC_B have been omitted to simplify the figure, but are well known by those skilled in the art with examples presented in TS23.009. The MSC_A and MSC_B are assumed to be those shown in FIG. 2. It is assumed that the UE about to leave the coverage area of the LNN, has also detected the cell produced by Node B 6. The RNC_B shown in FIG. 15, therefore corresponds to the RNC 8 in FIG. 2.

1. The procedure commences as a consequence of a measurement report that the UE transfers to the LNN. Such reports are made at constant intervals by UEs in order to ensure that the call channels are received at an appropriate strength and to ensure that call handover can occur. The measurement report contains measurement information made by the UE for cells on the same frequency, different frequencies, and different Radio Access Technology (RATs) assuming that the UE has knowledge of the different RATs and the different frequencies. The measurement information will contain the measurement results such as the RSCP, Ec/No and path loss measurements as well as other required information on the scrambling code of the cell and the cell-id.

Based on the measurements received, the LNN can decide whether to perform a handover to the macro network. The decision is based on the determined perceived quality of the connection for the current LNN cell, and the perceived quality of any overlapping macro cells of the network. The decision is perhaps made with reference to a minimum quality threshold. Such techniques are widely known in mobile networks.

2. If the LNN decides that it will perform the handover to a macro cell detected by the UE, then it will proceed by generating and transmitting a SIP REFER message to the MSC_A. Although this message is defined in the generic SIP standard, the present embodiment provides amendments to the message to effect a handover from the LNN.

The SIP REFER message generated by the LNN therefore includes modified information in the form of the SRNS context information that will be needed by the new RNC. This defines information that relates to the services that are currently active, including elements such as the RAB identity, the RAB Quality of Services parameters, the security keys currently in use and algorithms being used. Additionally, other NAS items such as the IMSI are also included.

This information would usually form the contents of the Relocation Request message that an RNC would send to the MSC in a normal system to effect the handover. In the preferred system however, this information can be included in a new SIP REFER header with a name such as:
P-Relocation-Information: Permanent NAS UE Identity=234150123451234, Cause="Relocation Triggered", CN Domain Indicator="CS Domain", Source RNC To Target RNC Transparent Container"

Some of the fields included are listed in the example above, though this list is not exhaustive.

The P-indicates that it is a private extension to the SIP message headers. In practice, assuming that the message receives approval within the SIP community for inclusion in the generic SIP specification, the P would not be necessary.

The contents of this new header comprise the information required for the MAP-Prep-Handover request message that is sent in the next step from the MSC_A to MSC_B, This information includes the RANAP protocol information defined in TS25.413, namely security parameters such as counters and keys, RAB configuration information, the target RNC identity and MAP protocol configuration defined in TS29.002. The target RNC identity is known by the UE from the measurements it made of the neighbouring cells and passed to the LNN in the measurement report message. The target cell identity is usually a 28 bit number comprised of a 12 bit RNC identity and a 16 bit cell identity.

For Release 5 implementations, the handover is implemented using a cell reselection followed by a SIP session transfer.

3. The REFER message is received by the SIP/MSC_A from the LNN and converted to the normal inter-MSC handover message MAP-Prep-Handover request. This message is passed to the MSC_B.

4. MSC_B then sends the 'Relocation Request' message to the new RNC_B, that will configure the macro cell for the UE to establishing a new call connection via the external macro network.

5. When the RNC has completed the configuration, the 'Relocation Request Ack' is sent from the RNC_B to the MSC_B.

6. The MSC_B sends the 'MAP-Prep-Handover-response' to MSC_A and in 7. MSC_A responds with the '202 Accepted' to the LNN 40 indicating that the relocation is proceeding correctly.

8. Next the LNN sends the PHYSICAL CHANNEL RECONFIGURATION message to the UE 4. This message is used to perform a hard handover between two cells, in this case, between the LNN 40 and the cell controlled by the RNC_B.

9. According to the information specified in the PHYSICAL CHANNEL RECONFIGURATION message, the UE changes to a different frequency and/or a different scrambling code to access the new cell. When the UE has acquired the new cell, the PHYSICAL CHANNEL RECONFIGURATION COMPLETE message is sent from the UE to the new RNC_B via the Node B 6 and the new macro cell.

10. The RNC_B on detection of the UE sends the 'Relocation Detect' message to the MSC_B.

11. MSC_B then sends the MAP-Process-Access-Signal Request message to the MSC_A.

12. MSC_A sends the SIP NOTIFY to the LNN indicating that the relocation was successful, and the LNN responds in 13 with a 200 Ok.

14. The Relocation Complete message is sent by the RNC_B to the MSC_B when the relocation is finished.

15. The MSC_B sends the MAP-Send-End-Signal Request to the MSC_A, which in turn 16 sends the 'BYE' message to the LNN terminating the SIP session with the UE.

17. The LNN acknowledges with the 200 Ok, and the call continues via the MSC_B and through the MSC_A acting as Anchor MSC for the call. MSC_A will be present until the call is dropped.

18. When the call completes, the MSC_A sends the MAP-Send-End-Signal response.

Thus a procedure has been described in which call and connection transfer can be achieved between the LNN and an external network, and in which the mechanism that is used for the connection transfer is consistent with the SIP protocol. The contents of the messages that are carried through the SIP protocol are also consistent with the messages that are carried between core network elements for an inter-MSC SRNS relocation, the messages for which are defined in TS25.413, TS23.009 and TS29.002.

LNN Identification and Power Control

One aspect of the deployment of an LNN that may pose a concern with the operators that own the spectrum in which the LNN will be deployed is the interference levels that the LNN may contribute to the overlying macro network. The LNN's will tend to be deployed in an ad-hoc manner with limited operator control of the location and characteristics of the LNN. We have therefore appreciated that it would be advantageous if the operator was able to take greater control of the method of deployment of the LNN in order to minimise interference.

The preferred embodiment address the problems of interference management by adding additional elements to the SIP messages that pass between the LNN and the operator's core network (either the SIP enabled MSC or the Release 5 S-CSCF). This may be implemented in one of two mechanisms. First by adding a new SIP header or alternatively by "cannibalising" an existing SIP header. Both aspects will be considered.

In this embodiment we will consider an example of the application of the invention to a PLMN that is defined according to the 3GPP specifications. Other types of PLMN exist and to which this invention would apply, the differences are in the names applied to the messages, not in the principles that lie behind the transfer of the messages.

All SIP messages that are passed between SIP clients, such as the LNN and the MSC_A/SIP, contain a SIP header that is referred to as the Call-ID. This is defined in the SIP standard [RFC3261] which states: " . . . the Call-ID header field must be selected by the User Agent Client (UAC) as a globally unique identifier over space and time unless overridden by method-specific behaviour."

In the preferred embodiment of the system, the structure of specific parts of the Call-ID identifier for the LNN will be specifically defined such that they contain additional useful information. The information that is passed to the core network in the SIP header preferably includes at least: the house number and postcode (or equivalent information in different geographic locations); the current LNN (average) transmit power; the LNN scrambling code; the Cell-Id, the transmit power and the time.

The structure of the Call-ID therefore comprises a number of fields, which describe the characteristics of the LNN such as physical location and logical cell designation, and which together result in a unique identifier. Preferably, all of the following fields are used, though more or less could be included if specified by, the network operator.

<House number of LNN location> <Postcode/ZIP of LNN location> <scrambling code id> <cell id> <Transmit power> <Time (UTC format)>

The Postcode and House number information could be obtained from the user of the LNN via a registration procedure before the LNN is made operational on the network. Alternately, the operator will know the Digital Subscriber Line Access Multiplexers (DSLAMS) a user is connected to and the postcode areas served by that DSLAM.

This information could be included in the message as plain text, or after applying a suitable encryption algorithm. The occasions when this information will be transmitted will include, but is not limited to, the SIP registration of the LNN, SIP session initiation and modification of the LNN.

Alternatively, instead of configuring the Call-ID in the manner described above, a new SIP header could be produced containing the same information. Preferably, the new SIP header would be identified as:

P-LNN-Connection-Information: <House number> <Postcode/ZIP> <scrambling code id> <cell id> <Transmit power> <Time (UTC format)>

In a typical network, the operator logs all of the signalling messages that are transferred between entities. In a network comprising the LNN and the modified messages, a record will therefore be built up of messages between the LNN and the core network. This can be consulted by the operator, either reading the plain text, or the text after decryption, to identify individual LNNs and their transmit power.

Thus a system has been proposed in which the operator can now monitor the location, power levels and characteristics of the LNNs that are present within the network. If the operator detects that there is a drop in performance in the macro network, the operator can examine the stored logs of LNN messages and identify potential causes of that interference based on the power level and location. Using the Operation and Maintenance O&M system, the operator will be able to adjust the maximum output power of the LNN, or adjust the scrambling code to overcome the effects of this interference.

In doing so the operator is able to more accurately predict and control the levels of interference within the network in which there are a number of LNNs deployed. Although the above description assumes that the Call-ID SIP header is modified, or a new SIP header is added, such modifications are preferably also applied to SDP headers in the same way.
Communication System Configuration In order for the LNN to operate properly, configuration of the device is necessary. Although a user interface on the LNN may be provided allowing configuration settings to be selected, it results in increased size and complexity of the LNN itself which is undesirable. We have therefore appreciated that a simplified configuration method is desirable.

Preferably therefore, the LNN receives configuration information from an application running on a user terminal located in the LNN coverage area. UE 4 in FIG. 2 may therefore be running such an application on a user interface. The application may rely on any suitable technology such as WMLScript, Java, or the USIM Application Toolkit.

The application is arranged to collect information from the user concerning the configuration of the LNN, or alternatively request configuration data from the LNN for display to the user on his UE. The implementation of such programs for UEs is known and need not be described further here. The configuration data that can be exchanged between the UE and the LNN preferably comprises information specifying:
i) The control methods that can be used to allow additional UEs to be added to those which are allowed access to the LNN;
ii) Methods to modify data for any existing UEs that are registered on the LNN; this may include removal of UEs from an access list;
iii) The storage of SMS messages to be delivered to one of the other registered UEs when they become active within the configuration area of the LNN;
iv) The storing of SMS messages to be delivered at specific dates and times to specific UEs registered in the LNN;
v) Control of the access profiles of other UEs that access the LNN. Such items may include the number of called minutes and the destination numbers allowed; and
vi) Which UEs have authorisation to supply configuration data to the LNN.

When the appropriate configuration data is collected from the user, the UE can forward the configuration data to the control function within the LNN. The control function then updates a configuration database which may be part of the LNN register or separate to it.

Preferably, UEs which are authorised to obtain or transmit configuration data use a simple PIN code. The LNN is configured with a 16 digit alphanumeric security code, and this security code is entered into the UE in response to a request from the application. The PIN code is then used in each message exchange to ensure that the request is coming from a valid UE to the LNN and also vice-versa.

The data transmission between the UE and LNN can be achieved through the use of an SMS connection, PS data connection or CS data connection. The specific mechanism may be selectable, by preference, by the user. If the CS-data and the PS-data channels are utilised, then this information can in addition, be sent over an encrypted connection between the UE and the LNN.

Thus, a UE is used to act as the configuration interface to the LNN. In doing so, simplification of the design of the user interface in the LNN is possible resulting in a reduction in the cost and an increase in the flexibility of the design.

The previous description is not intended to be limiting, and a number of modifications will occur to the skilled man within the scope of the claims. For example, although SIP has been described, other protocols may be used, or may evolve, for connection to an Internet compatible network. SIP is presently favoured as it greatly simplifies transmission across the internet compatible network. However, other schemes such as H.323 and H.324 could also be used.

Also, although a 3G system has been described, the LNN may be implemented in 2G systems. The Internet compatible networks could be any one of GSM, PSTN, PBX, PABX, CDMA 2000, WiFi modified to include a SIP entity or equivalent. Although ASDL has also been implemented in the Physical layer, xDSL, SDSL, VSDL and equivalents such as WIMAX may also be used.

The invention claimed is:

1. A system comprising:
a portable, user-controllable local network node (LNN) for transmitting messages between a User Equipment (UE) and an Internet: compatible network, the LNN being configured to provide a coverage cell to service one or more UEs and connect to, the LNN comprising:
an antenna for transmitting signals directly to, and receiving signals directly from, the UE according to a cellular radio protocol;
a connection with a user's Internet connection, the connection for transmitting messages to, and receiving messages from, the Internet-compatible network;
a conversion device configured to:
determine whether a data packet contains control data or user data;
in response to determining the data packet contains control data, convert the control data between cellular radio protocol signals and Internet-compatible network messages using a pattern matching process, and
in response to determining that the data packet contains user data, assign a radio access bearer identifier to the user data; and
a registrar configured to register the UE on the LNN including assigning a port for User Datagram Protocol (UDP) communications to the UE based on the radio access bearer identifier assigned by the LNN;
wherein the LNN is configured to provide access for the UE to the Internet-compatible network including sending messages from the UE to a call session control function and an SIP interface of a mobile switching center.

2. The system of claim 1, wherein the conversion device comprises a first processing stack for processing the signals according to the cellular radio protocol, the first processing stack having functionality corresponding to layers one to three of the Open Systems Interconnection model.

3. The system of claim 2, wherein the first processing stack comprises:
  i) a physical layer,
  ii) a Medium Access Control layer;
  iii) a Radio Link Control layer; and
  iv) a Radio Resource Control layer.

4. The system of claim 2, wherein the Radio Resource Control Layer comprises a Radio Access Bearer (RAB) function and a Layer 3 Non-Access Stratum (NAS) function.

5. The system of claim 2, comprising a second processing stack for processing signals according to an Internet Protocol, wherein an upper layer of the second processing stack is arranged to communicate with an upper layer of the first processing stack.

6. The system of claim 5, wherein the second processing stack comprises a Session Initiation Protocol (SIP) processing layer.

7. The system of claim 6, wherein the connection is for connection to a SIP enabled Mobile Switching Center (MSC) in the Release 99 or subsequent Universal Mobile Telecommunications Service (UMTS) architectures.

8. The system of claim 1, wherein the conversion device comprises:
  a database storing respective statuses of one or more subscribing UEs in the coverage cell of the LNN; and
  an analyzer for determining which message in which protocol is required next so that a service request from the Internet-compatible network to the UE, or from the UE to the Internet-compatible network, can be advanced based on the status of the UE and previous message.

9. The system of claim 1, wherein the connection is for connection to a Call Session Control Function of a Release 5 or subsequent Universal Mobile Telecommunications Service (UMTS) architectures.

10. The system of claim 1, wherein the LNN is configured to:
  i) request identity information comprising at least a International Mobile Subscriber Identity (IMSI) from a UE attempting to register with the Internet-compatible network via the LNN;
  ii) include the identity information in an Internet protocol (IP) Register message for registering the UE on the Internet-compatible network;
  iii) transmit the IP register message to the Internet-compatible network;
  iv) receive security parameters from the Internet-compatible network relating to the UE;
  v) transmit the security parameters to the UE via a radio cellular protocol message; and
  vi) receive a response from the UE and convert the response to an IP Register message such that the Internet-compatible network can validate an authenticity of the UE and complete registration on the Internet-compatible network.

11. The system of claim 10, wherein the IP Register message in operation ii), iii) or iv) of claim 10 is a SIP REGISTER message.

12. The system of claim 10, wherein the security parameters are received from the Internet-compatible network by an IP message that comprises a '401 Unauthorized' message.

13. A system comprising:
  a user-controllable local network node (LNN) for connecting a User Equipment (UE) configured for 3G use to a Session Initiation Protocol (SIP)-enabled network, the LNN being configured to provide a coverage cell to service one or more UEs, the LNN being configured to:
    transmit signals directly to, and receive signals directly from, the UE according to a cellular radio protocol;
    determine whether a data packet contains control data or user data;
    in response to determining the data packet contains control data, convert the control data received from or for transmission to the UE on an air interface to Internet Protocol messages compatible with Release 5 Universal Mobile Telecommunications Service (UMTS) architecture using a pattern matching process;
    in response to determining that the data packet contains user data, assign a radio access bearer identifier to the user data; and
  a registrar configured to register the UE on the LNN including assigning a port for User Datagram Protocol (UDP) communications to the UE based on the radio access bearer identifier assigned by the LNN;
  wherein the LNN is configured to provide access for the UE to the SIP-enabled network through a user's Internet connection, including sending messages from the UE to a call session control function and an SIP interface of a mobile switching center.

14. The system of claim 13, further comprising a database storing identities of UEs that are authorized to access the SIP-enabled network using the LNN.

15. The system of claim 14, further comprising a control module arranged to request identity information describing the UE when the UE makes a Location Update request to the LNN.

16. The system of claim 15, wherein the identity information is one or more of an International Mobile Subscriber Identity (IMSI) and an International Mobile Equipment Identity (IMEI).

17. The system of claim 16, wherein the LNN is configured to store the identity information in the database.

18. The system of claim 15, wherein the LNN is configured to:
  determine, from the database, whether a UE identified by the identity information determined to be authorized; and has made a location update request; and
  deny the request if the UE is not authorized.

19. The system of claim 18, wherein if the UE is found to be authorized, the LNN is configured to forward a network registration message received from the UE to the SIP-enabled network.

20. The system of claim 14, further comprising a register is arranged to store usage information for one or more authorized UEs.

21. The system of claim 20, further comprising a master UE configured to:
  access the database; and
  edit the usage information to control access allowed to other authorized UEs.

22. A system comprising:
  a portable, user-controllable local network node (LNN) for transmitting messages between a User Equipment (UE) and an Internet-compatible network, the LNN being configured to provide a coverage cell to service one or more UEs, the LNN comprising:
    an antenna for transmitting signals directly to, and receiving signals, directly from, the UE according to a cellular radio protocol;
    a connection with user's Internet connection, the connection for transmitting messages to, and receiving messages from, an Internet-compatible network;

a conversion device for:
  determining whether a data packet contains control data or user data,
  in response to determining the data packet contains control data, converting the control data between the radio cellular protocol and an Internet protocol of the Internet-compatible network using a pattern matching process, the conversion device generating a predetermined sequence of Internet-compatible network messages in response to a change in a state of the UE, and
  in response to determining that the data packet contains user data, assigning a radio access bearer identifier to the user data;
a registrar configured to register the UE on the LNN including assigning a port for User Datagram Protocol (UDP) communications to the UE based on the radio access bearer identifier assigned by the LNN;
a local database storing a registration status of one or more UEs, a registration status indicating whether a corresponding UE is allowed to connect to the Internet-compatible network through the LNN; and
a user interface to display the registration status of one or more of the one or more UEs, the user interface comprising one or more actuators;
wherein the LNN is configured to be installed in a private residence of a user;
wherein the local database is controllable via the one or more actuators of the user interface such that the user can alter the registration status of one or more UEs in the local database by activating one or more of the one or more actuators, the user having no macro network administration privileges; and
wherein the LNN is configured to provide access for the UE to the Internet-compatible network including sending messages from the UE to a call session control function and an SIP interface of a mobile switching center.

* * * * *

UNITED STATES PATENT AND TRADEMARK OFFICE
CERTIFICATE OF CORRECTION

PATENT NO. : 9,876,670 B2  
APPLICATION NO. : 11/572979  
DATED : January 23, 2018  
INVENTOR(S) : Andrew Richardson Page 1 of 1

It is certified that error appears in the above-identified patent and that said Letters Patent is hereby corrected as shown below:

In the Claims

At Column 27, Claim 4 please replace "The system of claim 2…" with --The system of claim 3--

Signed and Sealed this  
Twelfth Day of November, 2019

Andrei Iancu  
*Director of the United States Patent and Trademark Office*